(12) United States Patent
Orlowski et al.

(10) Patent No.: US 8,604,653 B2
(45) Date of Patent: Dec. 10, 2013

(54) CURRENT DIVERTER RING

(75) Inventors: David C. Orlowski, Punta Gorda, FL (US); Neil F. Hoehle, Solon, IA (US); Robert A. Tejano, Aledo, IL (US); Shawn Horton, Moline, IL (US)

(73) Assignee: Inpro/Seal, LLC, Rock Island, IL (US)

( * ) Notice: Subject to any disclaimer, the term of this patent is extended or adjusted under 35 U.S.C. 154(b) by 127 days.

(21) Appl. No.: 13/089,017

(22) Filed: Apr. 18, 2011

(65) Prior Publication Data

US 2011/0193446 A1   Aug. 11, 2011

Related U.S. Application Data

(63) Continuation-in-part of application No. 12/757,040, filed on Apr. 9, 2010, now abandoned, and a continuation-in-part of application No. 12/401,331, filed on Mar. 10, 2009, now abandoned, which is a continuation of application No. 11/378,208, filed on Mar. 17, 2006, now Pat. No. 7,521,827.

(60) Provisional application No. 60/693,548, filed on Jun. 25, 2005, provisional application No. 61/167,928, filed on Apr. 9, 2009, provisional application No. 61/218,912, filed on Jun. 19, 2009.

(51) Int. Cl.
*H01R 39/12* (2006.01)

(52) U.S. Cl.
USPC .................. 310/68 R; 310/219; 310/220

(58) Field of Classification Search
USPC ...... 310/68 R, 232, 67 R, 219–221; 361/212, 361/220–222; 439/28, 92, 95
See application file for complete search history.

(56) References Cited

U.S. PATENT DOCUMENTS

| 2,269,614 | A | 1/1942 | Von Soden |
| 3,785,049 | A | 1/1974 | Tatsumi et al. |
| 3,997,224 | A | 12/1976 | Ogawa et al. |
| 4,189,702 | A | 2/1980 | Maloy |
| 4,246,508 | A | 1/1981 | Zimmer |
| 4,347,456 | A | 8/1982 | Chabrerie |
| 4,403,164 | A | 9/1983 | Preece |
| 4,483,574 | A | 11/1984 | Chabrerie et al. |
| 4,801,270 | A | 1/1989 | Scarlata |

(Continued)

OTHER PUBLICATIONS

ISR received by Applicant in co-pending PCT application having serial No. PCT/US2012/034139; dated Nov. 9, 2012 received by Applicant on or around Nov. 16, 2012; submitted in its entirety.

*Primary Examiner* — Tran Nguyen
(74) *Attorney, Agent, or Firm* — Hamilton IP Law; Jay R. Hamilton; Charles A. Damschen

(57) ABSTRACT

The current diverter rings and bearing isolators serve to dissipate an electrical charge from a rotating piece of equipment to ground, such as from a motor shaft to a motor housing. One embodiment of the current diverter ring includes an inner body and an outer body configured to clamp at least one conductive segment between them. In the preferred embodiments of the current diverter ring, the conductive segments are positioned in radial channels. The outer body may be affixed to a shaft, a motor housing, a bearing isolator, or other structure. The bearing isolator may incorporate a retention chamber for holding conductive segments within the stator of the bearing isolator, or the bearing isolator may be fashioned with a receptor groove into which a current diverter ring may be mounted.

20 Claims, 21 Drawing Sheets

(56) References Cited

U.S. PATENT DOCUMENTS

| | | |
|---|---|---|
| 4,850,881 A | 7/1989 | Lagier et al. |
| 4,855,631 A | 8/1989 | Sato et al. |
| 5,010,441 A | 4/1991 | Fox et al. |
| 5,661,356 A | 8/1997 | Fisher et al. |
| 5,799,952 A * | 9/1998 | Morrison et al. ............. 277/355 |
| 5,812,908 A | 9/1998 | Larocca et al. |
| 5,912,516 A | 6/1999 | Atkinson et al. |
| 5,988,996 A | 11/1999 | Brookbank et al. |
| 6,913,265 B2 | 7/2005 | Datta |
| 6,972,052 B2 | 12/2005 | Krumma et al. |
| 6,984,906 B1 | 1/2006 | Martiny, Jr. |
| 7,071,589 B2 | 7/2006 | Bramel et al. |
| 7,136,271 B2 | 11/2006 | Oh et al. |
| 7,193,836 B2 * | 3/2007 | Oh et al. ........................ 361/220 |
| 7,528,513 B2 * | 5/2009 | Oh ................... 310/88 |
| 8,169,766 B2 * | 5/2012 | Oh et al. ........................ 361/221 |
| 8,189,317 B2 * | 5/2012 | Oh et al. ........................ 361/221 |
| 8,199,453 B2 * | 6/2012 | Oh et al. ........................ 361/221 |
| 2002/0121821 A1 | 9/2002 | Ritter |
| 2006/0007609 A1 | 1/2006 | Oh et al. |
| 2010/0127585 A1 | 5/2010 | Fee et al. |

\* cited by examiner

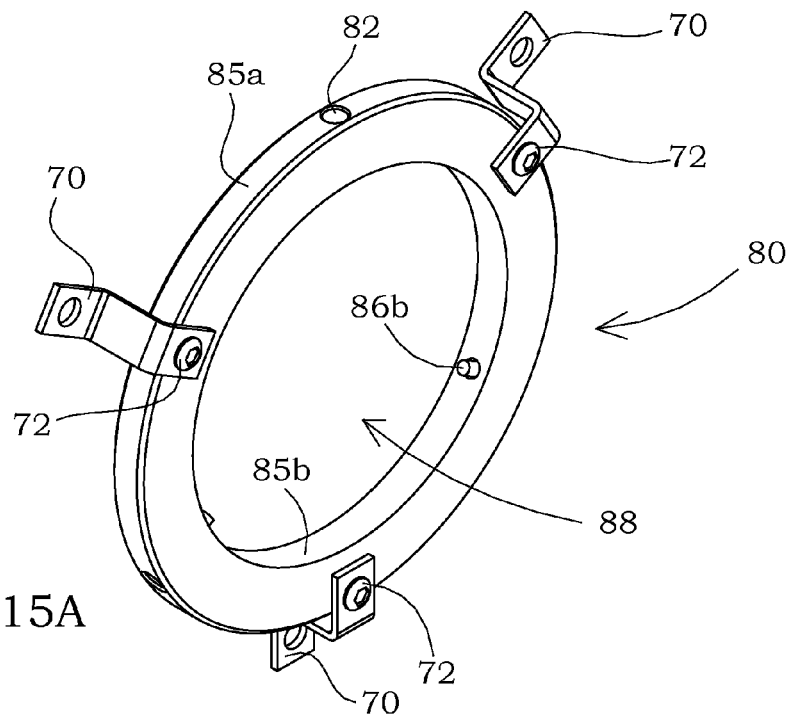
FIG. 15A
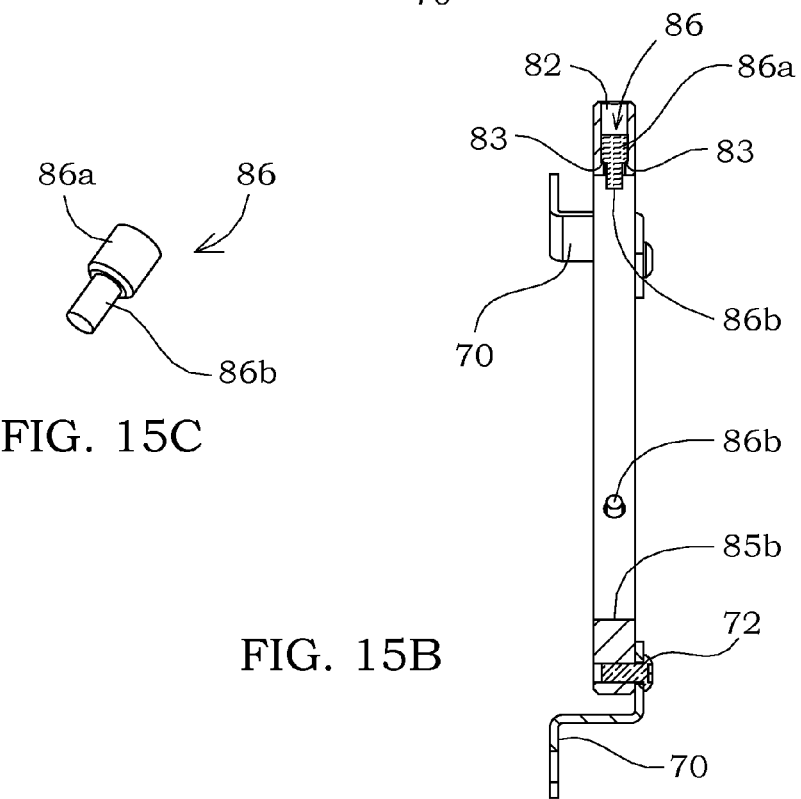
FIG. 15C
FIG. 15B

CURRENT DIVERTER RING

CROSS-REFERENCE TO RELATED APPLICATIONS

N/A

FIELD OF THE INVENTION

The present invention relates to an electrical charge dissipating device, and more particularly to a current diverter Ring™ for directing electrostatic charge to ground, which electrostatic charge is created through the use of rotating equipment.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.171 (d)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever. CDR and Current Diverter Ring are the exclusive trademarks of Assignee, Inpro/Seal LLC.

BACKGROUND OF THE INVENTION

Adequate maintenance of rotating equipment, particularly electric motors, is difficult to obtain because of extreme equipment duty cycles, the lessening of service factors, design, and the lack of spare rotating equipment in most processing plants. This is especially true of electric motors, machine tool spindles, wet end paper machine rolls, aluminum rolling mills, steam quench pumps, and other equipment utilizing extreme contamination affecting lubrication.

Various forms of shaft sealing devices have been utilized to try to protect the integrity of the bearing environment. These devices include rubber lip seals, clearance labyrinth seals, and attraction magnetic seals. Lip seals or other contacting shaft seals often quickly wear to a state of failure and are also known to permit excessive amounts of moisture and other contaminants to immigrate into the oil reservoir of the operating equipment even before failure has exposed the interface between the rotor and the stator to the contaminants or lubricants at the radial extremity of the seal. The problems of bearing failure and damage as applied to electrical motors using variable frequency drives (VFDs) is compounded because of the very nature of the control of electricity connected to VFD controlled motors.

VFDs regulate the speed of a motor by converting sinusoidal line alternating current (AC) voltage to direct current (DC) voltage, then back to a pulse width modulated (PWM) AC voltage of variable frequency. The switching frequency of these pulses ranges from 1 kHz up to 20 kHz and is referred to as the "carrier frequency." The ratio of change in voltage to the change in time ($\Delta V/\Delta T$) creates what has been described as a parasitic capacitance between the motor stator and the rotor, which induces a voltage on the rotor shaft. If the voltage induced on the shaft, which is referred to as "common mode voltage" or "shaft voltage," builds up to a sufficient level, it can discharge to ground through the bearings. Current that finds its way to ground through the motor bearings in this manner is called "bearing current."[1] [1]Http://www.greenheck-.com/technical/tech_detail.php?display=filed/Product_guide/fall7_03

There are many causes of bearing current including voltage pulse overshoot in the VFD, non-symmetry of the motor's magnetic circuit, supply imbalances, and transient conditions, among other causes. Any of these conditions may occur independently or simultaneously to create bearing currents from the motor shaft.[2]
[2] Http://www.greenheck.com/technical/tech_detail.php?display=files/Product_guide/fall7_03

Shaft voltage accumulates on the rotor until it exceeds the dielectric capacity of the motor bearing lubricant, at which point the voltage discharges in a short pulse to ground through the bearing. After discharge, voltage again accumulates on the shaft and the cycle repeats itself. This random and frequent discharging has an electric discharge machining (EDM) effect, which causes pitting of the bearing's rolling elements and raceways. Initially, these discharges create a "frosted" or "sandblasted" effect on surfaces. Over time, this deterioration causes a groove pattern in the bearing race called "fluting," which is an indication that the bearing has sustained severe damage. Eventually, the deterioration will lead to complete bearing failure.[3]
[3]See www.Greenheck.com The prior art teaches numerous methods of mitigating the damage shaft voltages cause, including using a shielded cable, grounding the shaft, insulated bearings, and installation of a Faraday shield. For example, U.S. Pat. No. 7,193,836 discloses devices for controlling shaft current, which devices are designed to induce ionization in the presence of an electrical field.

Most external applications add to costs, complexity, and exposure to external environmental factors. Insulated bearings provide an internal solution by eliminating the path to ground through the bearing for current to flow. However, installing insulated bearings does not eliminate the shaft voltage, which will continue to find the lowest impedance path to ground. Thus, insulated bearings are not effective if the impedance path is through the driven load. Therefore, the prior art does not teach an internal, low-wearing method or apparatus to efficaciously ground shaft voltage and avoid electric discharge machining of bearings leading to premature bearing failure.

SUMMARY OF THE INVENTION

An objective of the current diverter ring is to provide an improvement to seals or bearing isolators to prevent leakage of lubricant and entry of contaminants by encompassing the stator within the rotor to create an axially directed interface at the radial extremity of the rotor. It is also an objective of the current diverter ring to disclose and claim an apparatus for rotating equipment that conducts and transmits and directs accumulated bearing current to ground.

It is another objective of the bearing isolator as disclosed and claimed herein to facilitate placement of a current diverter ring within the stator of the bearing isolator. Conductive segments may be positioned within the current diverter ring. These conductive segments may be constructed of metallic or non-metallic solids, machined or molded. Although any type of material compatible with operating conditions and metallurgy may be selected, bronze, gold, carbon, or aluminum are believed to be preferred materials because of increased conductivity, strength, corrosion and wear resistance.

It has been found that a bearing isolator having a rotor and stator manufactured from bronze has improved electrical charge dissipation qualities. The preferred bronze metallurgy is that meeting specification 932 (also referred to as 932000 or "bearing bronze"). This bronze is preferred for bearings and bearing isolators because it has excellent load capacity and antifriction qualities. This bearing bronze alloy also has good machining characteristics and resists many chemicals. It is believed that the specified bronze offers increased shaft voltage collection properties comparable to the ubiquitous lightning rod due to the relatively low electrical resistivity (85.9 ohms-cmil/ft @68 F or 14.29 microhm-cm @20 C) and high electrical conductivity (12% IACS @68 F or 0.07 MegaSiemens/cm @20 C) of the material selected.

It is another object of the current diverter ring and bearing isolator to improve the electrical charge dissipation characteristics from those displayed by shaft brushes typically mounted external of the motor housing. Previous tests of a combination bearing isolator with a concentric current diverter ring fixedly mounted within the bearing isolator have shown substantial reduction in shaft voltage and attendant electrostatic discharge machining Direct seating between the current diverter ring and the bearing isolator improves the conduction to ground over a simple housing in combination with a conduction member as taught by the prior art. Those practiced in the arts will understand that this improvement requires the electric motor base to be grounded, as is the norm.

It is therefore an objective of the current diverter ring and bearing isolator to disclose and claim an electric motor for rotating equipment having a bearing isolator that retains lubricants, prevents contamination, and conducts and transmits bearing current to ground.

It is another objective of the current diverter ring and bearing isolator to provide a bearing isolator for rotating equipment that retains lubricants, prevents contamination and conducts electrostatic discharge (shaft voltage) to improve bearing operating life.

It is another objective of the current diverter ring to provide an effective apparatus to direct electrical charges from a shaft to a motor housing and prevent the electrical charge from passing to ground through the bearing(s).

Other objects, advantages and embodiments of the current diverter ring and bearing isolator will become apparent upon the reading the following detailed description and upon reference to drawings.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

FIG. 15A is a perspective view of a third embodiment of the current diverter ring.

FIG. 15B is an axial cross section view of the third embodiment of the current diverter ring.

FIG. 15C is a perspective view of one embodiment of a conductive assembly that may be used with certain embodiments of the CDR.

DETAILED DESCRIPTION - ELEMENT LISTING

Figure 1:
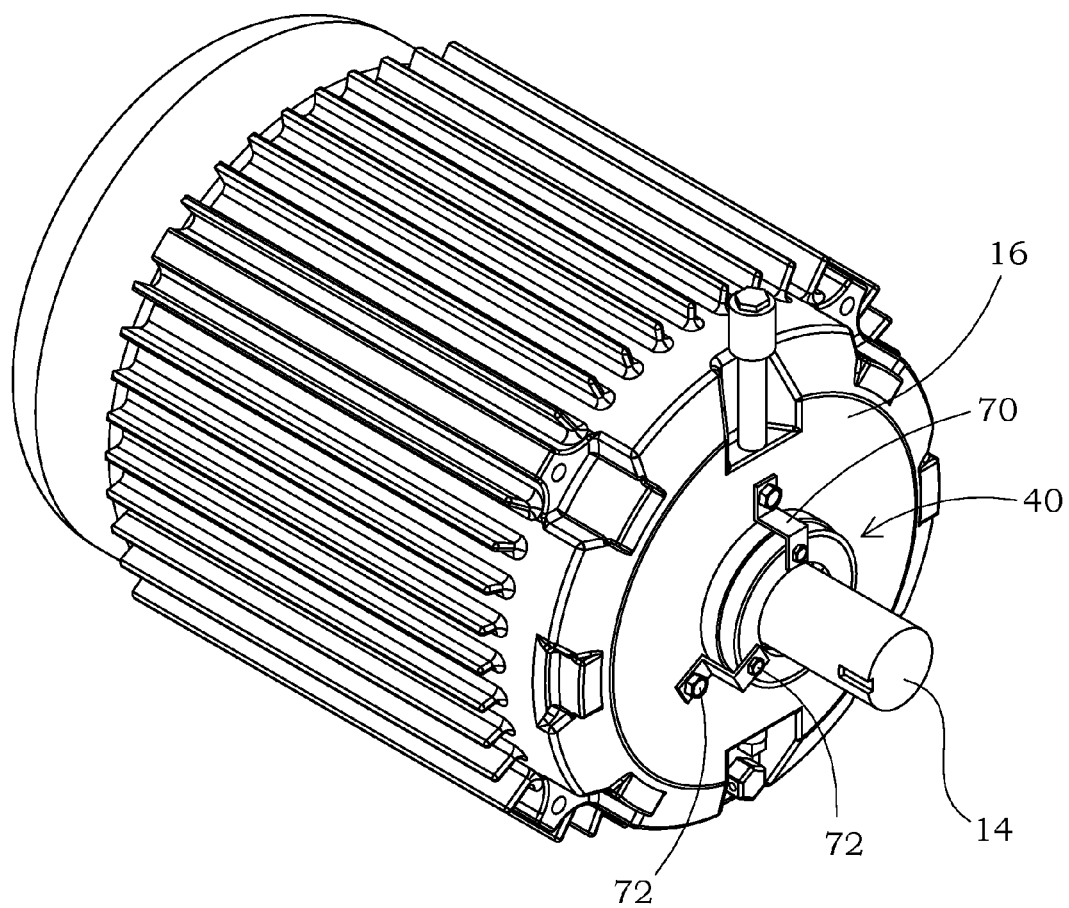
FIG. 1 is a perspective view of one embodiment of an electric motor with which the current diverter ring may be employed.

| Description | Element No. |
| --- | --- |
| Bearing isolator | 10 |
| Bearing | 12 |
| Shaft | 14 |
| Equipment housing | 16 |
| Sealing member | 17 |
| O-ring | 18 |
| Stator | 20 |
| Stator main body | 22 |
| Stator radial exterior surface | 23 |
| Receptor groove | 24 |
| Stator axial projection | 26 |
| Stator radial projection | 28 |
| Stator axial groove | 29 |
| Rotor | 30 |
| Rotor main body | 32 |
| Rotor axial exterior surface | 33 |
| First axial interface gap | 34a |
| First radial interface gap | 34b |
| Rotor axial projection | 36 |
| Rotor radial projection | 38 |
| Rotor axial groove | 39 |
| Current diverter ring ™ (CDR ®) | 40 |
| CDR body | 41 |
| Annular channel | 42 |
| First wall | 43 |
| Second wall | 44 |
| CDR radial exterior surface | 45 |
| Conductive segment | 46 |
| CDR main aperture | 48 |
| Inner body | 50 |
| Radial channel | 52 |
| Catch | 52a |
| Mounting aperture | 54 |
| Ridge (locking) | 56 |
| Inner body main aperture | 58 |
| Outer body | 60 |
| Base | 62 |
| Annular groove | 64 |
| First annular shoulder | 65a |
| Second annular shoulder | 65b |
| Radial projection | 66 |
| Outer body main aperture | 68 |
| Strap | 70 |
| Fastener | 72 |
| Radial CDR | 80 |
| Radial channel | 82 |
| Radial channel shelf | 83 |
| Radial exterior surface | 85a |
| Radial interior surface | 85b |
| Conductive assembly | 86 |
| Binder | 86a |
| Contact portion | 86b |
| Main aperture | 88 |
| Multi-ring CDR | 100 |
| Retainer | 110 |
| Retainer base | 111 |
| First annular groove | 112a |
| Second annular groove | 112b |
| Third annular groove | 112c |
| Fourth annular groove | 112d |
| Snap groove | 113 |
| Retainer wall | 114 |
| Retainer radial exterior surface | 115 |
| Conductive segment | 116 |
| Retainer main aperture | 118 |
| Ring | 120 |
| Radial channel | 122 |

DETAILED DESCRIPTION - ELEMENT LISTING (continued)

| Description | Element No. |
| --- | --- |
| Catch | 122a |
| Ring radial exterior surface | 125 |
| Ridge | 126 |
| Interior axial surface | 127a |
| Exterior axial surface | 127b |
| Ring main aperture | 128 |
| Split ring segment | 130 |
| Backing ring | 140 |
| Alignment pin | 141 |
| Alignment pin receptor | 142 |
| Fastener bore | 143 |
| Fastener receptor | 144 |
| O-ring channel | 145 |
| Aperture | 146 |
| Backing ring fastener | 148 |
| Adaptable CDR | 160 |
| Slot | 161 |
| Radial channel | 162 |
| Radial channel shelf | 163 |
| Recess | 164 |
| Radial exterior surface | 165a |
| Radial interior surface | 165b |
| Cut out | 166 |
| Main aperture | 168 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Additionally, the terms CDR 40, radial CDR 80, multi-ring CDR 100, and adaptable CDR 160 may be used interchangeably when referring to generalities of configuration with a bearing isolator 10, methods and/or materials of construction, and/or other general features.

One embodiment of an equipment housing 16 with which the CDR® 40 may be used is shown in FIG. 1. The CDR 40 may be press-fit into an aperture in the equipment housing 16, or it may be secured to the exterior of the equipment housing 16 using straps 70 and fasteners 72 as described in detail below and as shown in FIG. 1. The CDR 40 may also be secured to an equipment housing 12 via other structures and/or methods, such as chemical adhesion, welding, rivets, or any other structure and/or method suitable for the particular application. The CDR 40 may also be configured to be engaged with a bearing isolator 10, or integrally formed with a bearing isolator 10, as described in detail below.

Figure 2:
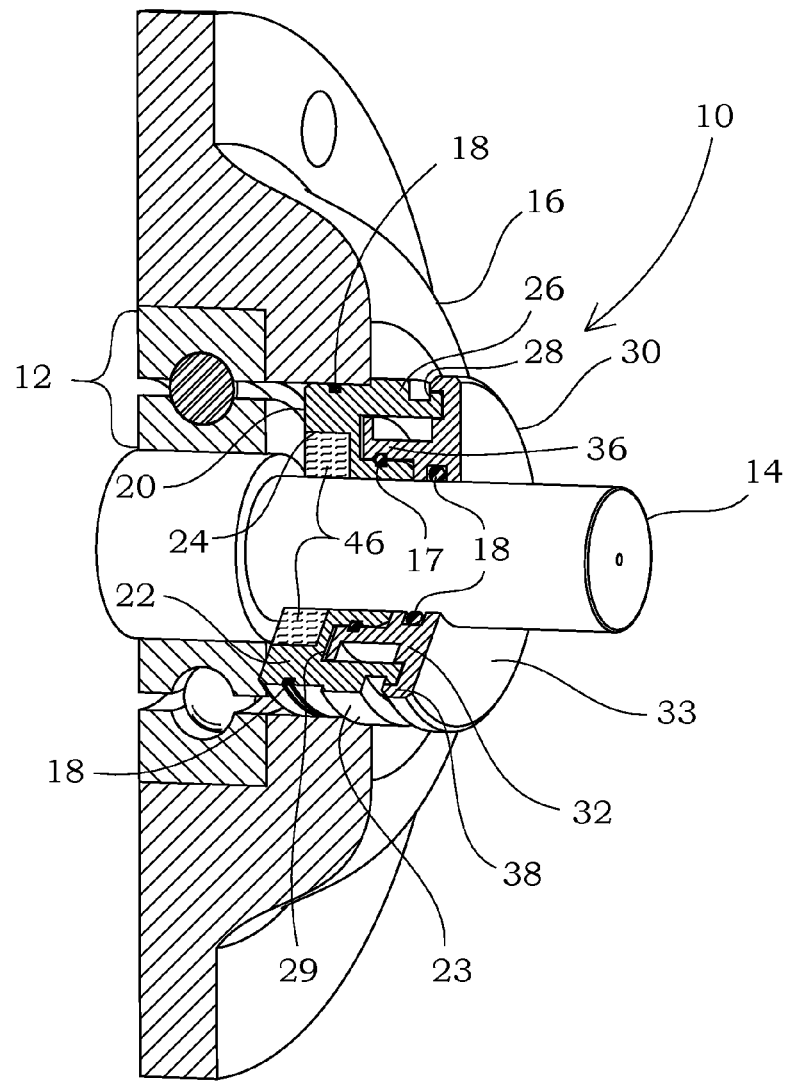
FIG. 2 is a perspective cross-sectional view of a bearing isolator wherein a portion of the stator is fashioned as a current diverter ring.

FIG. 2 illustrates a perspective view of one embodiment of a bearing isolator 10 configured to discharge electrical impulses from the shaft 14 through the equipment housing 16. The bearing isolator 10 as shown in FIG. 2 may be mounted to a rotatable shaft 10 on either one or both sides of the equipment housing 16. The bearing isolator 10 may be flange-mounted, press-fit (as shown in FIG. 2), or attached to the equipment housing 16 using any other method and/or structure suitable for the particular application, as was described above for the CDR 40. In some embodiments, set screws (not shown) or other structures and/or methods may be used to mount either the stator 20 to the equipment housing 16 or the rotor 30 to the shaft 14. In another embodiment not pictured herein, the shaft 14 is stationary and the equipment housing 16 or other structure to which the bearing isolator 10 is mounted may rotate.

First Embodiment of a Single-Piece CDR and Bearing Isolator

In another embodiment, the CDR 40 and/or bearing isolator 10 may be mounted such that either the CDR 40 and/or bearing isolator 10 are allowed to float in one or more directions. For example, in one embodiment a portion of the bearing isolator 10 is positioned in an enclosure. The enclosure is fashioned as two opposing plates with main apertures therein, through which main apertures the shaft passes 14. The interior of the enclosure is fashioned such that the bearing isolator 10 and/or CDR 40 is positioned within a truncated circle (i.e., pill-shaped) recess on the interior of the enclosure. The contact points between the bearing isolator 10 and/or CDR 40 and the enclosure may be formed with a low friction substance, such as Teflon®, affixed thereto.

Figure 3:
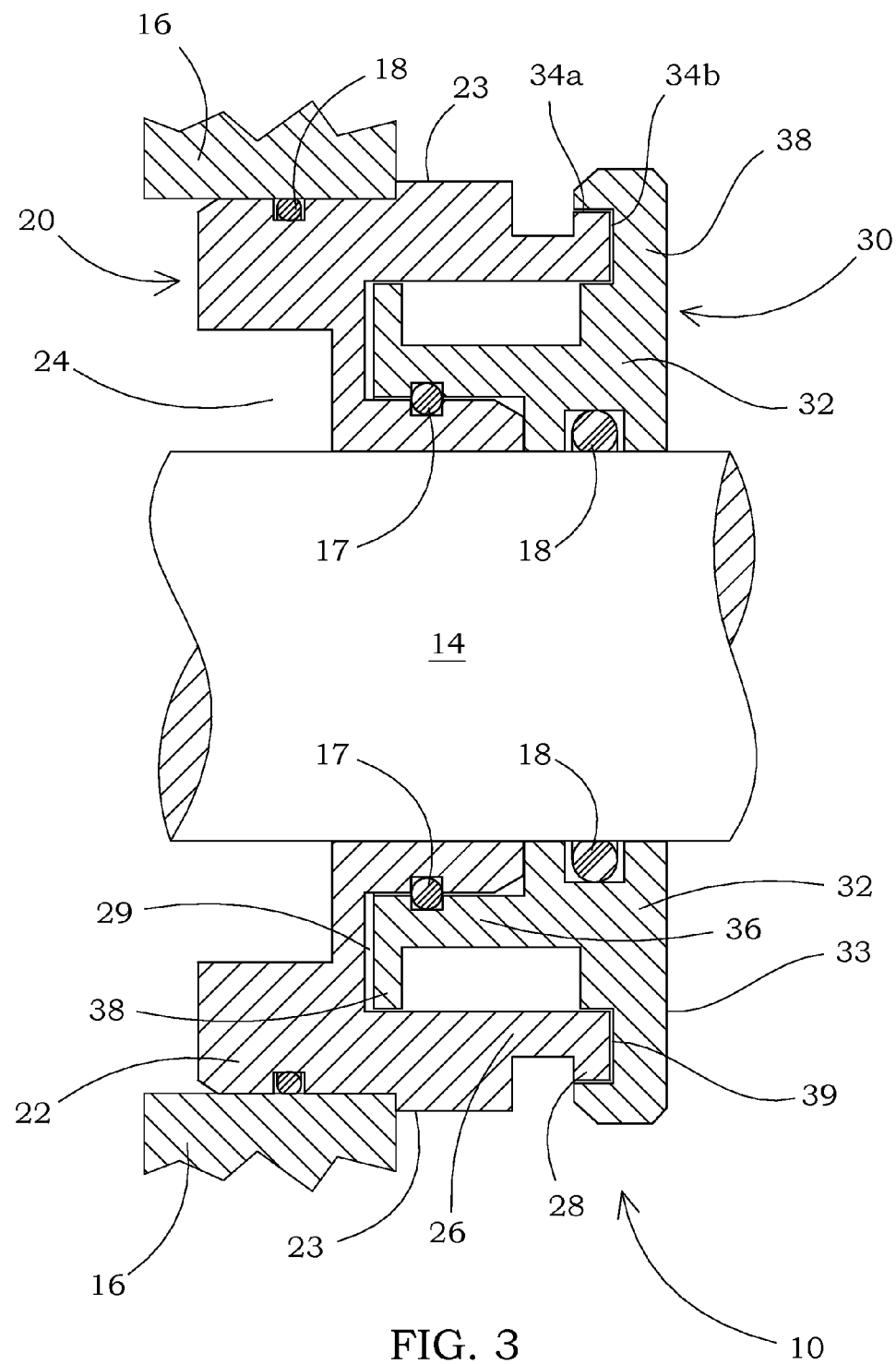
FIG. 3 is a cross-sectional view of a bearing isolator configured to accept a current diverter ring within the stator portion of the bearing isolator.

A more detailed cross-sectional view of one embodiment of a bearing isolator 10 with which the CDR 40 may be used is shown in FIG. 3. The bearing isolator 10 shown in FIGS. 2 and 3 includes a stator 20 and a rotor 30, and is commonly referred to as a labyrinth seal. Generally, labyrinth seals are well known to those skilled in the art and include those disclosed in U.S. Pat. Nos. 7,396,017; 7,090,403; 6,419,233; 6,234,489; 6,182,972; and 5,951,020; and U.S. Pat. App. Pub. No. 2007/0138748, all of which are incorporated by reference herein in their entireties.

The stator 20 may be generally comprised of a stator main body 22 and various axial and/or radial projections extending therefrom and/or various axial and/or radial grooves configured therein, which are described in more detail below. In the embodiment shown in FIGS. 2 and 3, the stator 20 is fixedly mounted to an equipment housing 16 with an O-ring 18 forming a seal therebetween.

The rotor 30 may be generally comprised of a rotor main body 32 and various axial and/or radial projections extending therefrom and/or various axial and/or radial grooves configured therein, which are described in more detail below. In the embodiment shown, one stator axial projection 26 cooperates with a rotor axial groove 39, and one rotor axial projection 36 cooperates with a stator axial groove 29 to form a labyrinth passage between the interior portion of the bearing isolator 10 and the external environment. The rotor 30 may be fixedly mounted to a shaft 14 and rotatable therewith. An O-ring 18 may be used to form a seal therebetween. A sealing member 17 may be positioned between the stator 20 and rotor 30 on an interior interface therebetween to aide in prevention of contaminants entering the interior of the bearing isolator 10 from the external environment while simultaneously aiding in retention of lubricants in the interior of the bearing isolator 10.

In the embodiment of the bearing isolator 10 shown in FIGS. 2 and 3, one stator radial projection 28 provides an exterior groove in the stator 20 for collection of contaminants. A first axial interface gap 34a may be formed between the radially exterior surface of a stator radial projection 28 and the radially interior surface of a rotor radial projection 38. A first radial interface gap 34b may be formed between the axially exterior surface of a stator axial projection 26 and the axially interior surface of a rotor axial groove 39. A rotor axial projection 36 formed with a rotor radial projection 38 may be configured to fit within a stator axial groove 29 to provide another axial interface gap between the stator 20 and the rotor 30.

In the embodiment of a bearing isolator 10 pictured herein, one rotor radial projection 38 (adjacent the rotor axial exterior surface 33) extends radially beyond the major diameter of the stator axial projection 26. This permits the rotor 30 to encompass the stator axial projection 26. As is fully described in U.S. Pat. No. 6,419,233, which is incorporated by reference herein in its entirety, this radial extension is a key design feature of the bearing isolator 10 shown herein. The axial orientation of the first axial interface gap 34a controls entrance of contaminants into the bearing isolator 10. Reduction or elimination of contaminants improves the longevity and performance of the bearing isolator 10, bearing 12, and conductive segment(s) 46. The opening of the first axial interface gap 34a faces rearward, toward the equipment housing 16 and away from the contaminant stream. The contaminant or cooling stream will normally be directed along the axis of the shaft 14 and toward the equipment housing 16.

To facilitate the discharge of electric energy on or adjacent the shaft 14, the bearing isolator 10 may include at least one conductive segment 46 positioned within the stator 20. The stator 20 may be configured with a conductive segment retention chamber adjacent the bearing 12, in which conductive segment retention chamber the conductive segment 46 may be positioned and secured such that the conductive segment 46 is in contact with the shaft 14. As electrical charges accumulate on the shaft 14, the conductive segment 46 serves to dissipate those charges through the bearing isolator 10 and to the equipment housing 16. The specific size and configuration of the conductive segment retention chamber will depend on the application of the bearing isolator 10 and the type and size of each conductive segment 46. Accordingly, the size and configuration of the conductive segment annular channel is in no way limiting.

Configuring the conductive segment retention chamber as an annular channel it is not preferred. This configuration results in difficulties relating to, among other things, performance and manufacturing. A preferred configuration of the conductive segment retention chamber is a radial channel 52, such as those described for the CDR 40 embodiment shown in FIGS. 7-14 or as described for the radial CDR 80, shown in FIGS. 15A-15C.

In the embodiment pictured herein, the bearing isolator 10 is formed with a receptor groove 24. The receptor groove 24 may be fashioned on the inboard side of the bearing isolator 10 adjacent the shaft 14, as best shown in FIG. 3. Generally, the receptor groove 24 facilitates the placement of a CDR 40 within the bearing isolator 10. However, other structures may be positioned within the receptor groove 24 depending on the specific application of the bearing isolator 10.

As shown and described, the bearing isolator 10 in FIGS. 2 and 3 includes a plurality of radial and axial interface passages between the stator 20 and the rotor 30 resulting from the cooperation of the stator projections 26, 28 with rotor grooves 39 and the cooperation of rotor projections 36, 38 with stator grooves 29. An infinite number of configurations and/or orientations of the various projections and grooves exist, and therefore the configuration and/or orientation of the various projections and grooves in the stator 20 and/or rotor 30 are in no way limiting. The bearing isolator 10 as disclosed herein may be used with any configuration stator 20 and/or rotor 30 wherein the stator 20 may be configured with a conductive segment retention chamber for retaining at least one conductive segment 46 therein or a receptor groove 24 as described in detail below.

Figure 4:
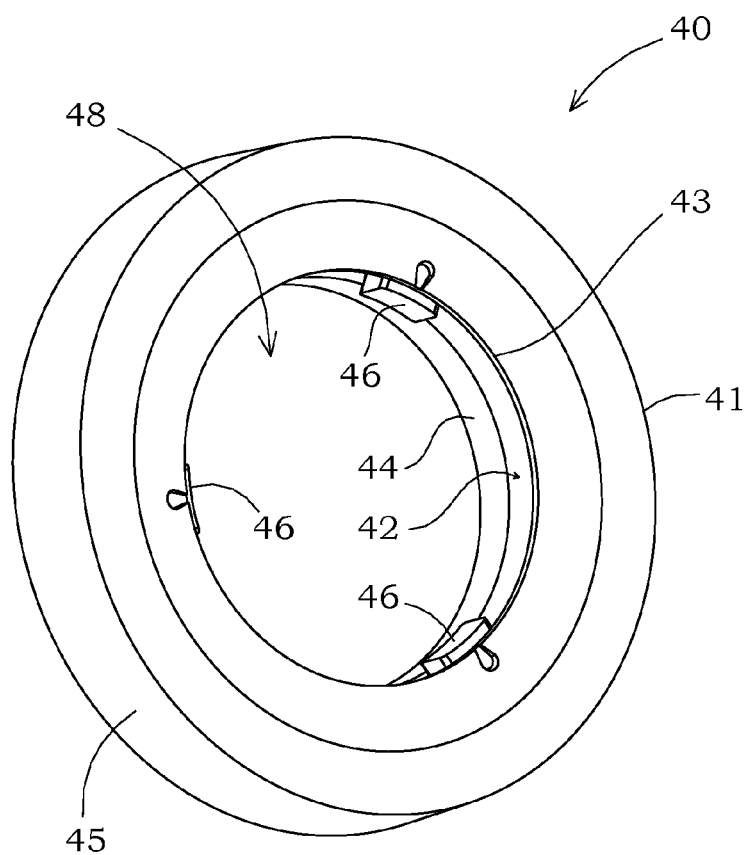
FIG. 4 is a perspective view of the first embodiment of the current diverter ring.
Figure 5:
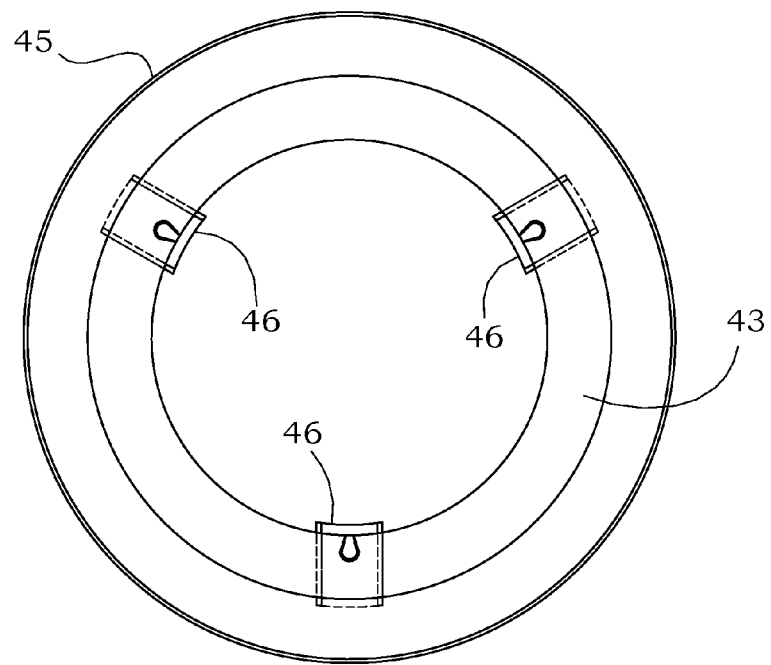
FIG. 5 is an axial view of the first embodiment of the current diverter ring.

A first embodiment of a current diverter ring (CDR) 40 is shown in perspective in FIG. 4, and FIG. 5 provides an axial view thereof. The CDR 40 may be used with any rotating equipment that has a tendency to accumulate an electrical charge on a portion thereof, such as electrical motors, gearboxes, bearings, or any other such equipment. The first embodiment of the CDR 40 is designed to be positioned between an equipment housing 16 and a shaft 14 protruding from the equipment housing 16 and rotatable with respect thereto.

Generally, the CDR 40 is comprised of a CDR body 41, which may be fixedly mounted to the equipment housing 16. In the first embodiment, a first wall 43 and a second wall 44 extend from the CDR body 41 and define an annular channel 42. At least one conductive segment 46 is fixedly retained in the annular channel 42 so that the conductive segment 46 is in contact with the shaft 14 so as to create a low impedance path from the shaft 14 to the equipment housing 16.

Figure 6:
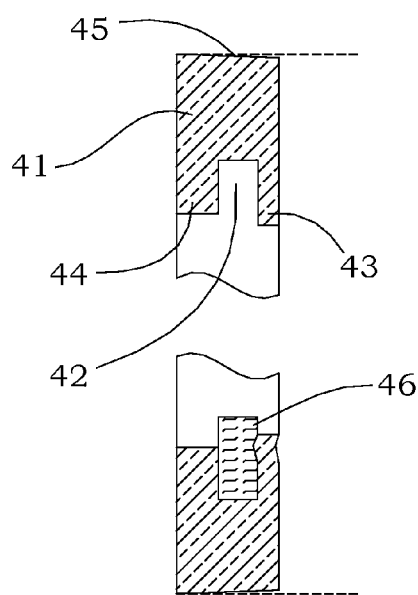
FIG. 6 is a cross-sectional view of the first embodiment of the current diverter ring.
Figure 7:
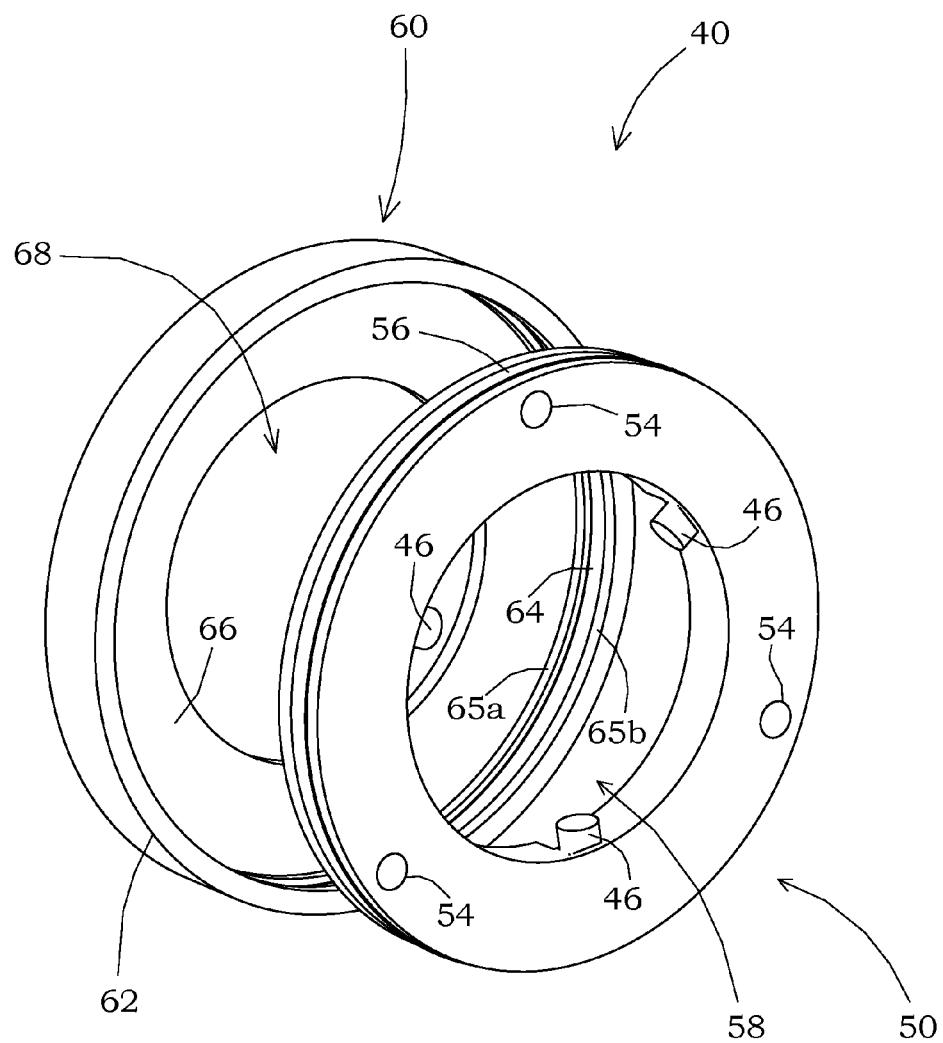
FIG. 7 is a perspective, exploded view of a second embodiment of the current diverter ring.

A cross-sectional view of the first embodiment of the CDR 40 is shown in FIG. 6. As shown in FIG. 6, the axial thickness of the first wall 43 is less than that of the second wall 44. In the first embodiment, the conductive segment 46 is retained within the annular channel 42 by first positioning the conductive segment 46 within the annular channel 42 and then deforming the first wall 43 to reduce the clearance between the distal ends of the first and second walls 43, 44. Deforming the first wall 43 in this manner retains the conductive segment 46 within the annular channel 42. Depending on the material used for constructing the conductive segment 46, the deformation of the first wall 43 may compress a portion of the conductive segment 46 to further secure the position of the conductive segment 46 with respect to the shaft 14.

A detailed view of the CDR radial exterior surface 45 is shown in FIG. 6. The CDR radial exterior surface 45 may be configured with a slight angle in the axial dimension so that the CDR 40 may be press-fit into the equipment housing 16. In the first embodiment, the angle is one degree, but may be more or less in other embodiments not pictured herein. Also, in the first embodiment the first wall 43 is positioned adjacent the bearing 12 when the CDR 40 is installed in an equipment housing 16. However, in other embodiments not shown herein, the second wall 44 may be positioned adjacent the bearing 12 when the CDR 40 is installed in an equipment housing 16, in which case the angle of the CDR radial exterior surface 45 would be opposite of that shown in FIG. 6. The optimal dimensions/orientation of the CDR body 41, annular channel 42, first wall 43, second wall 44, and CDR radial exterior surface 45 will vary depending on the specific application of the CDR 40 and are therefore in no way limiting to the scope of the CDR 40.

As was true for the bearing isolator 10, a CDR 40 with a conductive segment retention chamber configured as an annular channel is not preferred. Performance and manufacturing considerations are among the reasons such a configuration is not preferred. Instead, the other embodiments of the CDR disclosed herein, which do not have an annular channel 42 and the attending difficulties, are preferred.

In other embodiments of the CDR 40 described in detail below, the CDR 40 is mounted to the equipment housing 16 using mounting apertures 54, straps 70, and fasteners 72 fashioned in either the CDR 40 or equipment housing 16. The CDR 40 may be mounted to the equipment housing 16 by any method using any structure suitable for the particular application without departing from the spirit and scope of the CDR 40.

In the embodiment of the CDR 40 shown in FIGS. 4 and 5, three conductive segments 46 are positioned within the annular channel 42. The optimal number of conductive segments 46 and the size and/or shape of each conductive segment 46 will vary depending on the application of the CDR 40, and is therefore in no way limiting. The optimal total length of all conductive segments 46 and the total surface area of the conductive segments 46 that are in contact with the shaft 14 will vary from one application to the next, and is therefore in no way limiting to the scope of the CDR 40 or of a bearing isolator 10 configured with conductive segments 46 (such as the bearing isolator shown in FIGS. 2 and 3).

In the embodiment shown in FIGS. 4-6, the CDR 40 may be sized to be engaged with a bearing isolator 10 having a receptor groove 24, such as the bearing isolator 40 shown in FIGS. 2 and 3. As described above, FIGS. 2 and 3 shown one embodiment of a bearing isolator 10 fashioned to engage a CDR 40. The receptor groove 24 may be formed as a recess in the stator 20 that is sized and shaped to accept a CDR 40 similar to the one shown in FIGS. 4-6, or other embodiments of the CDR 40 disclosed herein. The CDR 40 may be press-fit into the receptor groove 24, or it may be affixed to the stator 20 by any other method or structure that is operable to fixedly mount the CDR 40 to the stator 20, including but not limited to set screws, welding, etc. When the CDR 40 is properly engaged with the receptor groove 24 in the stator 20, the CDR radial exterior surface 45 abuts and contacts the interior surface of the receptor groove 24.

In any of the embodiments of the CDR 40 or bearing isolator 10 employing conductive segments 46, the conductive segment 46 may be constructed of carbon, which is conductive and naturally lubricious. In one embodiment, the conductive segment 46 is constructed of a carbon mesh manufactured by Chesterton and designated 477-1. In other embodiments the conductive segment 46 has no coating on the exterior of the carbon mesh. When mesh or woven materials are used to construct the conductive segments 46, often the surface of the conductive segment 46 that contacts the shaft 14 becomes frayed or uneven, which may be a desirable quality to reduce rotational friction in certain applications. Shortly after the shaft 14 has been rotating with respect to the conductive segments 46, certain embodiments of the conductive segments 46 will wear and abrade from the surface of the shaft 14 so that friction between the conductive segments 46 and the shaft 14 is minimized. The conductive segments 46 may be fibrous, solid, or other material without limitation.

In general, it is desirable to ensure that the impedance from the shaft 14 to the equipment housing 16 is in the range of 0.2 to 10 ohms to ensure that electrical charges that have accumulated on the shaft 14 are discharged through the equipment housing 16 and to the base of the motor (not shown) rather than through the bearing(s) 12. The impedance from the shaft 14 to the equipment housing 16 may be decreased by ensuring the fit between the bearing isolator 10 and equipment housing 16, bearing isolator 10 and CDR 40, and/or CDR 40 and equipment housing 16 has a very small tolerance. Accordingly, the smaller the gap between the bearing isolator 10 and equipment housing 16, bearing isolator 10 and CDR 40, and/or CDR 40 and equipment housing 16, the lower the impedance from the shaft 14 to the equipment housing 16.

In other embodiments not pictured herein, conductive filaments (not shown) may be affixed to either the CDR 40 or bearing isolator 10 or embedded in conductive segments 46 affixed to either the CDR 40 or bearing isolator 10. Such filaments may be constructed of aluminum, copper, gold, carbon, conductive polymers, conductive elastomers, or any other conductive material possessing the proper conductivity for the specific application. Any material that is sufficiently lubricious and with sufficiently low impedance may be used for the conductive segment(s) 46 in the CDR 40 and/or bearing isolator 10.

In another embodiment of the CDR 40 not pictured herein, the CDR 40 is affixed to the shaft 14 and rotates therewith. The first and second walls 43, 44 of the CDR 40 extend from the shaft 14, and the CDR main body 41 is adjacent the shaft 14. The centrifugal force of the rotation of the shaft 14 causes the conductive segments 46 and/or conductive filaments to expand radially as the shaft 14 rotates. This expansion allows the conductive segments 46 and/or filaments to make contact with the equipment housing 16 even if grease or other contaminants and/or lubricants (which increase impedance and therefore decrease the ability of the CDR 40 to dissipate electrical charges from the shaft 14 to the equipment housing 16) have collected in an area between the CDR 40 and the equipment housing 16.

In another embodiment not pictured herein, a conductive sleeve (not shown) may be positioned on the shaft 14. This embodiment is especially useful for a shaft 14 having a worn or uneven surface that would otherwise lead to excessive wear of the conductive segments 46. The conductive sleeve (not shown) may be constructed of any electrically conductive material that is suitable for the particular application, and the conductive sleeve (not shown) may also be fashioned with a smooth radial exterior surface. The conductive sleeve (not shown) would then serve to conductive electrical charges from the shaft 14 to the conductive segments 46 in either the CDR 40 or a bearing isolator 10. Another embodiment that may be especially useful for use with shafts 14 having worn or uneven exterior surfaces is an embodiment wherein conductive filaments or wires are inserted into the conductive segments 46. These conductive filaments or wires may be sacrificial and fill in depressions or other asperities of the surface of the shaft 14.

In another embodiment not pictured herein, conductive screws (not shown) made of suitable conductive materials may be inserted into the conductive segments 46. Furthermore, spring-loaded solid conductive cylinders may be positioned within the CDR 40 and/or bearing isolator 10 in the radial direction so as to contact the radial exterior surface of the shaft 14.

Although elegant in its design, the CDR 40 shown in FIGS. 4-6 is not the preferred embodiment of the CDR 40, as previously mentioned. Among other considerations, performance and manufacturing difficulties with this design dictate that other embodiments of the CDR 40 are more desirable. Particularly, the two-piece CDR 40 shown in FIGS. 7-14 and described in detail below and the radial CDR 80 shown in FIGS. 15A, 15B result in both of those embodiments being superior to that shown in FIGS. 4-6.

Illustrative Embodiment of a Two-Piece CDR

A second embodiment of a CDR 40 is shown in FIGS. 7-14. In the second embodiment of the CDR 40, the CDR is formed from the engagement of an inner body 50 with an outer body 60, which are shown disengaged but in relation to one another in FIG. 7. The inner body 50 and outer body 60 in the second embodiment of the CDR 40 engage one another in a snapping, interference-type fit, which is described in detail below.

Figure 9:
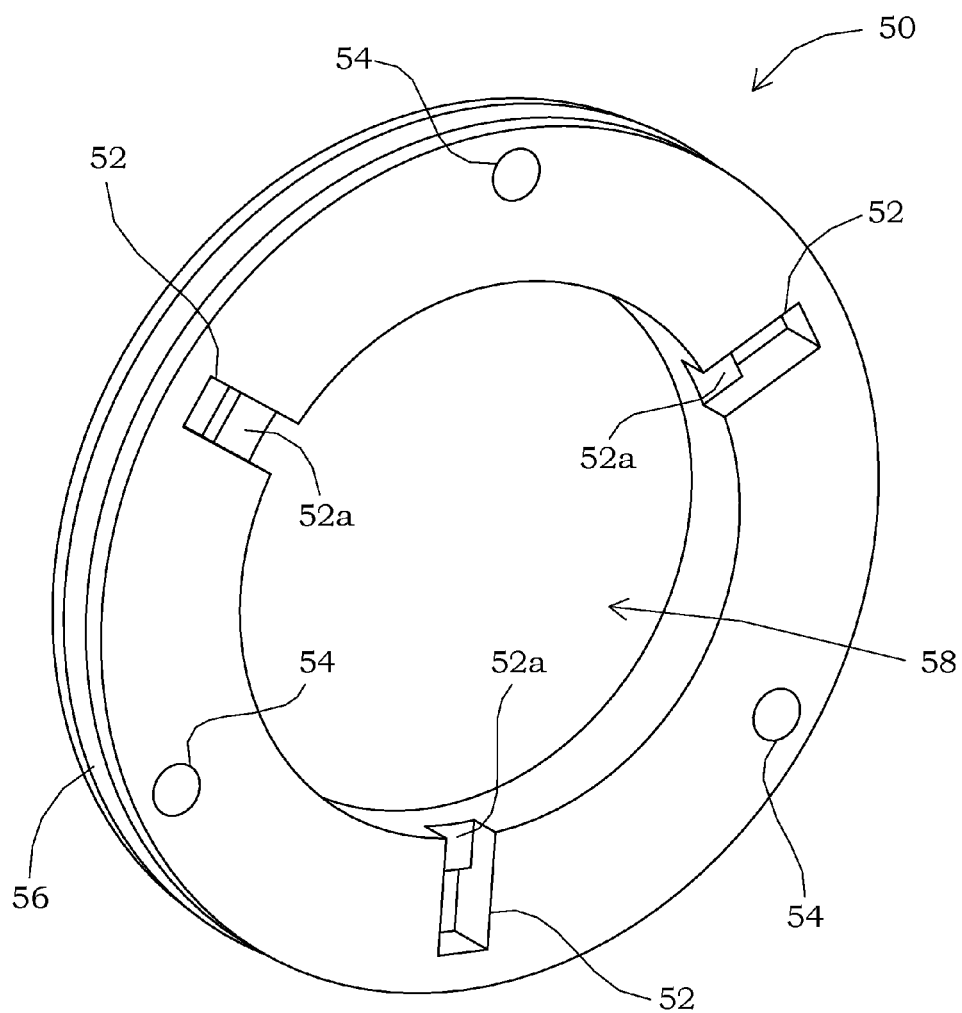
FIG. 9 is a detailed perspective view of one embodiment of an inner body for use with the second embodiment of the current diverter ring.

A perspective view of an inner body 50, which may be generally ring shaped, is shown in FIG. 9. The inner body 50 may include at least one radial channel 52 fashioned in an exterior face of the inner body 50, which includes a main aperture 58 through which a shaft 14 may be positioned. The embodiment pictured in FIG. 9 includes three radial channels 52, but other embodiments may have a greater or lesser number of radial channels 52, and therefore the number of radial channels in no way limits the scope of the CDR 40. Each radial channel 52 may be formed with a catch 52a therein to more adequately secure certain types of conductive segments 46. It is contemplated that a catch 52a will be most advantageous with conductive segments 46 made of a deformable or semi-deformable material (as depicted in FIG. 14B), but a catch 52a may be used with conductive segments 46 constructed of materials having different mechanical properties. The radial channels 52 as shown are configured to open toward a shaft 14 positioned in the main aperture 58. The inner body 50 may be formed with a ridge 56 on the radial exterior surface thereof. The ridge 56 may be configured to engage the annular groove 64 formed in the outer body 60 as described in detail below.

Figure 8A:
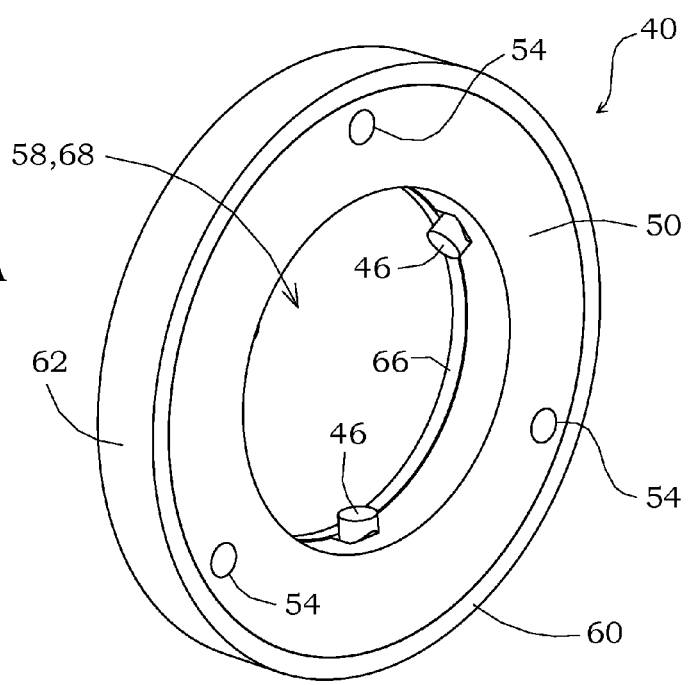
FIG. 8A is a perspective view of a second embodiment of the current diverter ring assembled.
Figure 8B:
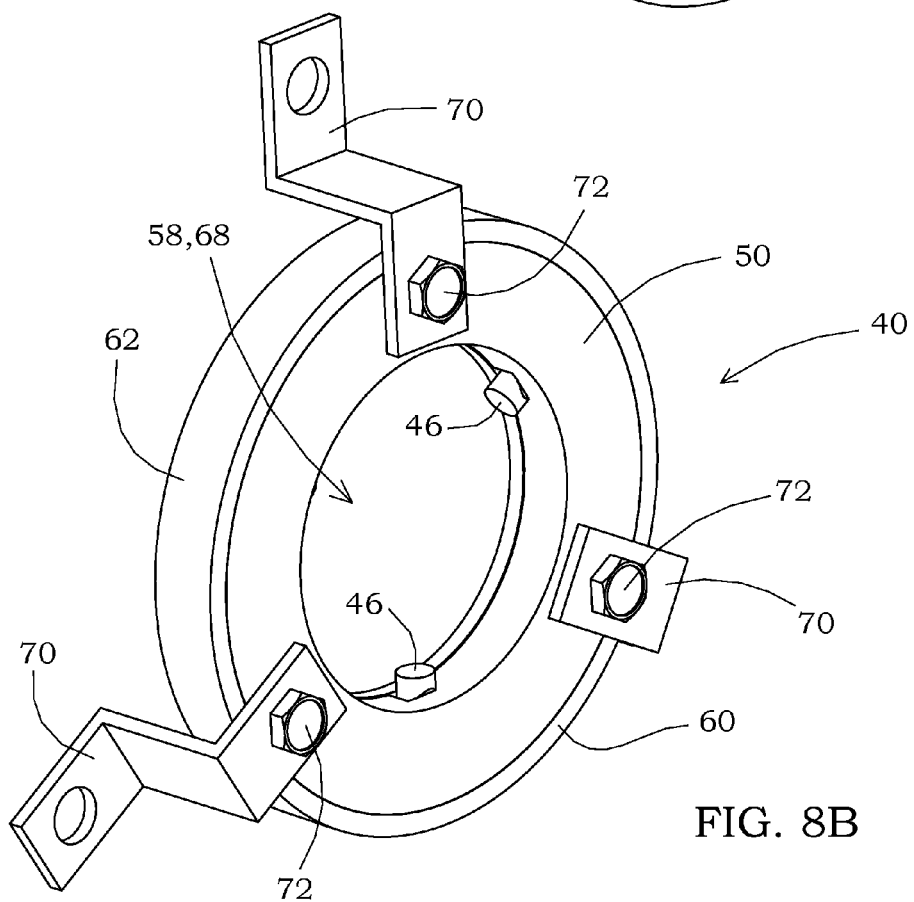
FIG. 8B is a perspective view of a second embodiment of the current diverter ring assembled with mounting clips.

The inner body 50 may be formed with one or more mounting apertures 54 therein. The embodiment shown in FIGS. 8-11 is formed with three mounting apertures 54. Mounting apertures 54 may be used to secure the CDR 40 to an equipment housing 16 or other structure as shown in FIG. 1. A strap 70 or clip may be secured to the CDR 40 using a fastener 72, such as a screw or rivet, engaged with a mounting aperture 54, as shown in FIGS. 1 and 8B. The presence or absence of mounting apertures 54 will largely depend on the mounting method of the CDR 40. For example, in the embodiment shown in FIGS. 14A and 14B, the inner body 50 does not include any mounting apertures 54. It is contemplated that such embodiments will be optimal for use within a bearing isolator 10 and/or a CDR 40 that will be press fit into an equipment housing 16 or other structure.

Figure 12:
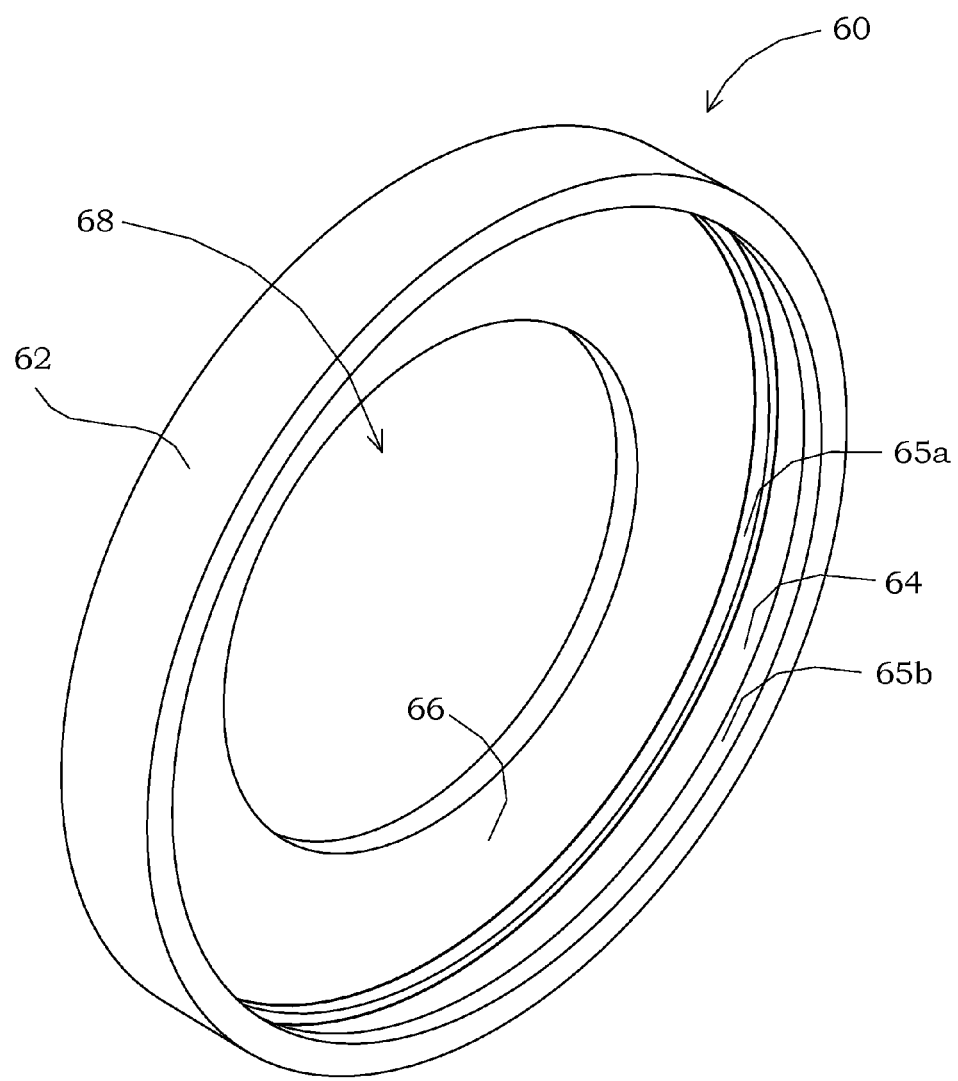
FIG. 12 is a detailed perspective view of one embodiment of an outer body for use with the second embodiment of the current diverter ring.
Figure 13A:
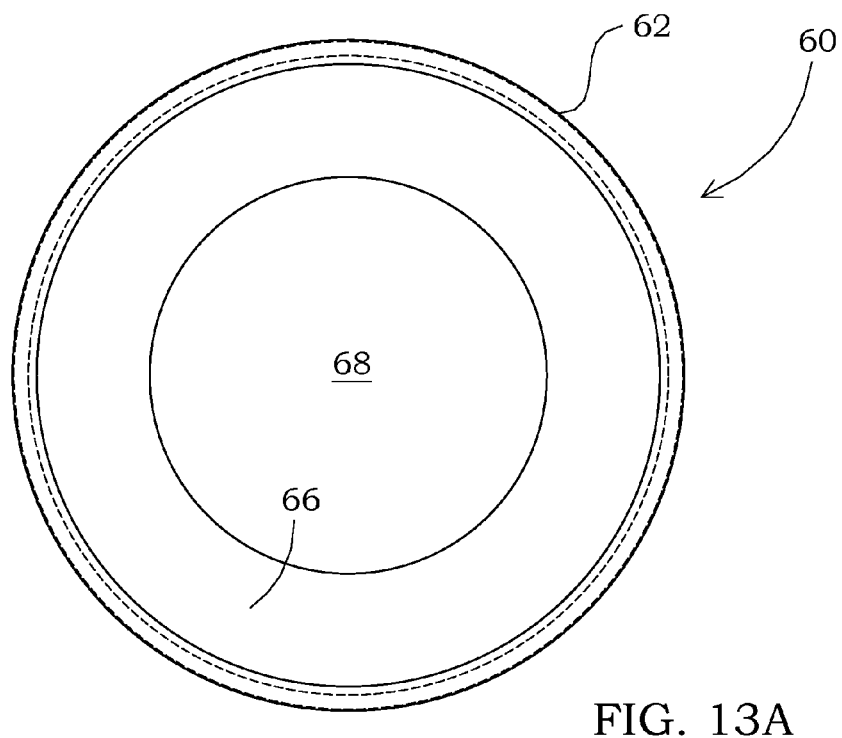
FIG. 13A is an axial view of one embodiment of an outer body for use with the second embodiment of the current diverter ring.
Figure 13B:
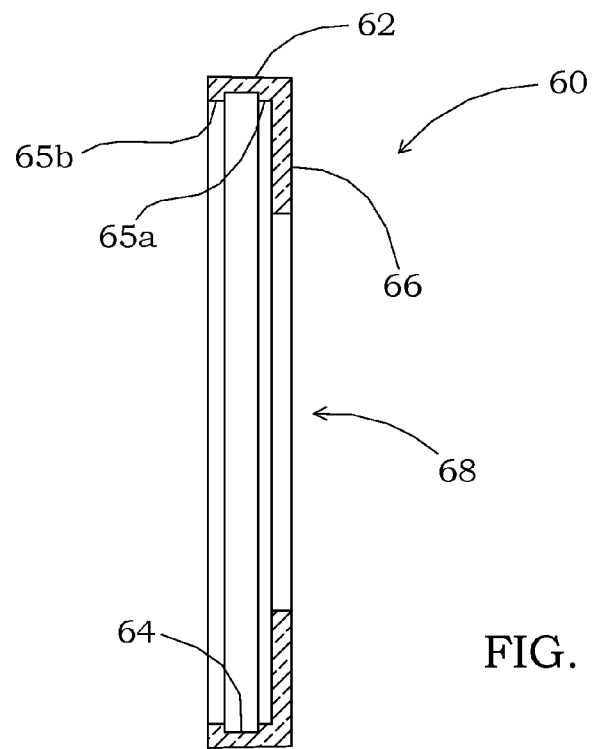
FIG. 13B is a cross-sectional view of one embodiment of an outer body for use with the second embodiment of the current diverter ring.

A perspective view of an outer body 60, which also may be generally ring shaped, is shown in FIG. 12. The outer body 60 may be formed with a base 62 having an annular groove 64 formed on the radial interior surface thereof. The annular groove 64 may be defined by a first annular shoulder 64a and a second annular shoulder 65b. A radial projection 66 may extend radially inward from the base 62 adjacent either the first and/or second shoulder 65a, 65b. In the embodiment pictured, the radial projection 66 is positioned adjacent the first annular shoulder 65a and includes a main aperture 68 therein, through which a shaft 14 may be positioned.

Figure 10A:
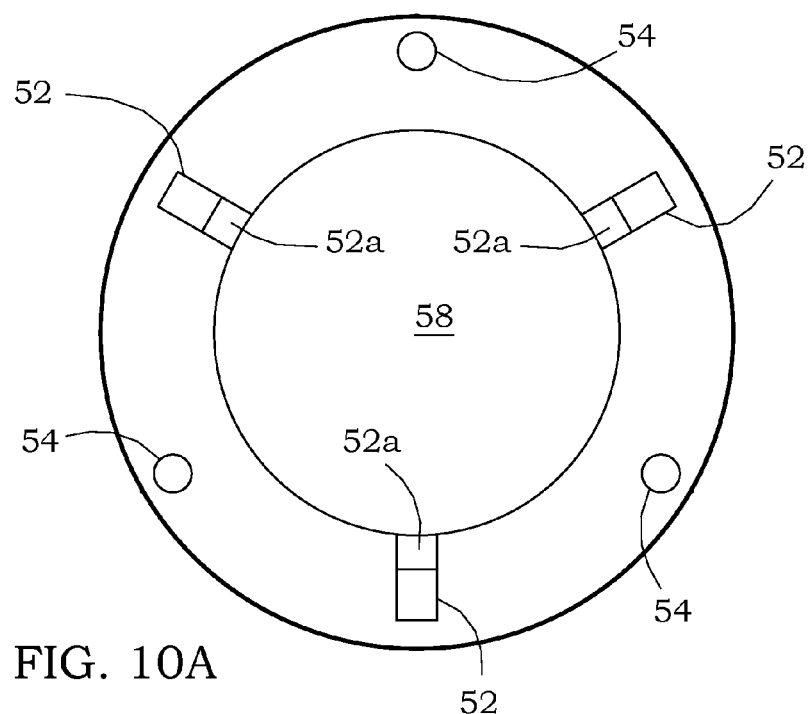
FIG. 10A is an axial view of one embodiment of an inner body for use with the second embodiment of the current diverter ring.
Figures 10B, 11:
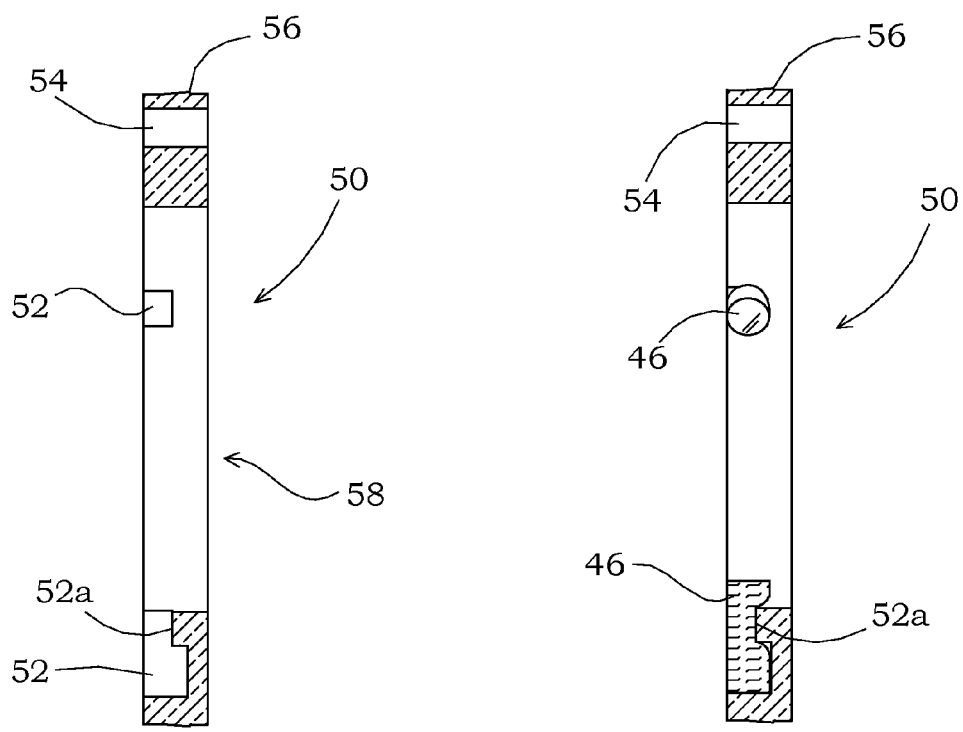
FIG. 10B is a cross-sectional view of one embodiment of an inner body for use with the second embodiment of the current diverter ring.
FIG. 11 is a cross-sectional view of one embodiment of an inner body for use with the second embodiment of the current diverter ring with conductive fibers positioned therein.

The annular groove 64 may be configured such that the ridge 56 formed in the inner body 50 engages the annular groove 64 so as to substantially fix the axial position of the inner body 50 with respect to the outer body 60. As shown in FIGS. 10B, and 14B, the ridge 56 may be slanted or tapered so that upon forced insertion of the inner body 50 in the outer body 60, the ridge 56 slides past the second annular shoulder 65b and into the annular groove 64 to axially secure the inner body 50 and the outer body 60. The engagement between the ridge 56 and the annular groove 64 thereafter resists separation or dissociation of the inner and outer bodies 50, 60. In other embodiments not shown herein, the ridge 56 is not limited to a tapered configuration. The ridge 56 and base 62 may also be configured so an interference fit is created upon engagement to resist separation or disassociation of the inner and outer bodies 50, 60.

Figure 14A:
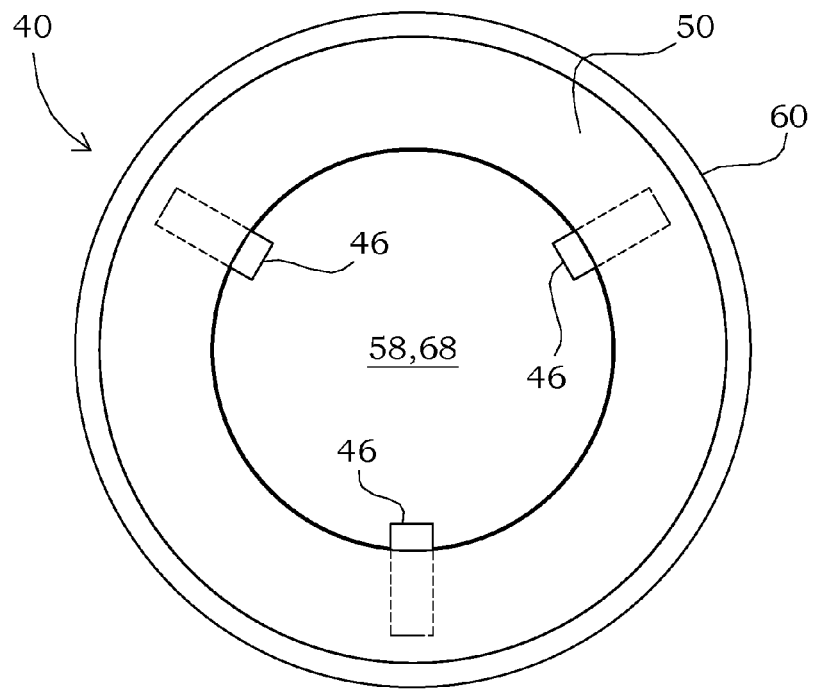
FIG. 14A is an axial view of the second embodiment of the current diverter ring assembled.
Figure 14B:
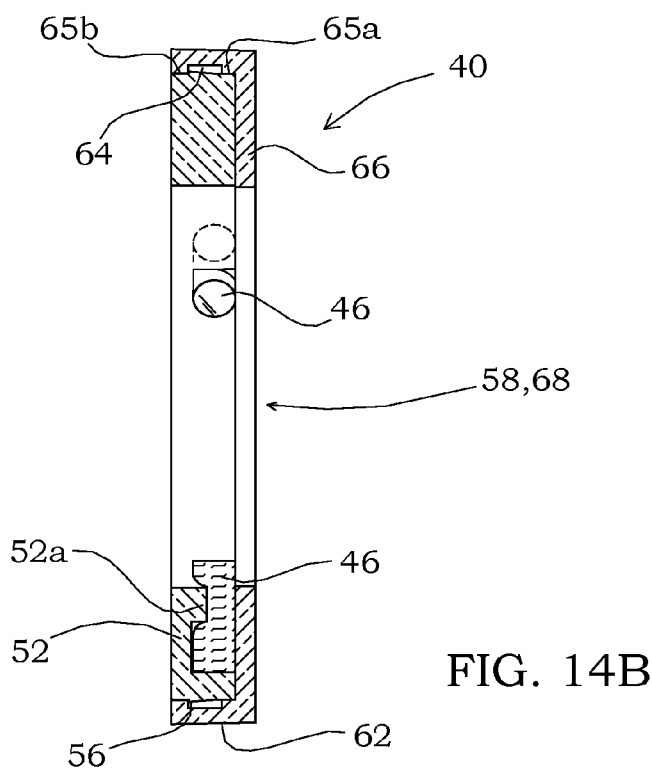
FIG. 14B is a cross-sectional view of the second embodiment of the current diverter ring assembled.

As shown in FIGS. 14A and 14B, the inner body 50 and outer body 60 may be configured so that the interior periphery of the radial projection 66 has the same diameter as the interior periphery of the inner body 50 so that both the inner and outer bodies 50, 60 have the same clearance from a shaft 14 when installed. It is contemplated that in most applications the CDR 40 will be installed so that the surface shown in FIG. 14A is axially exterior to the equipment housing 16 or other structure. However, if the CDR 40 is engaged with a bearing isolator 10, the CDR 40 may be oriented such that the surface shown in FIG. 14A is facing toward the interior of the equipment housing 16 or other structure to which the bearing isolator 10 is mounted.

As shown in FIG. 11, conductive segments 46 may be positioned in each radial channel 52. It is contemplated that the radial channels 52 will be fashioned in the axial surface of the inner body 50 that is positioned adjacent the radial projection 66 of the outer body 60 when the CDR 40 is assembled, as shown in FIGS. 14A and 14B. This orientation secures the axial position of the conductive segments 46. As mentioned previously, a CDR 40 employing radial channels 52 for retention of conductive segments 52 is preferred as compared to a CDR 40 having an annular channel 42. Typically, but depending on the materials of construction, the conductive segments 46 are sized so as to extend past the minor diameter of the inner body 50 into the main aperture 58 to contact the shaft 14. The radial channels 52 are sized so as to not intersect the outer periphery of the inner body 50. This prevents the conductive segment 46 from contacting the annular groove 64 of the outer body 60.

The bearing isolator 10 and CDR 40 may be constructed from any machinable metal, such as stainless steel, bronze, aluminum, gold, copper, and combinations thereof, or other material having low impedance. The CDR 40 or bearing isolator 10 may be flange-mounted, press-fit, or attached to the equipment housing 16 by any other structure or method, such as through a plurality of straps 70 and fasteners 72.

In certain applications, performance of the bearing isolator 10 may be improved by eliminating the O-rings 18 and their companion grooves fashioned in the stator 20 and the rotor 30, as shown in FIGS. 2 and 3. The high-impedance nature of material used to construct the O-ring 18 (such as rubber and/or silicon) may impede conductivity between bearing isolator 10 and the equipment housing 16, thereby decreasing the overall electrical charge dissipation performance of the bearing isolator 10. However, if the O-rings 18 may be constructed of a low-impedance material, they may be included in any application of the CDR 40 and/or bearing isolator 10. The optimal dimensions/orientation of the CDR 40, inner body 50, outer body 60, and various features thereof will vary depending on the specific application of the CDR 40 and are therefore in no way limiting to the scope of the CDR 40.

Second Embodiment of a Single-Piece CDR

A radial CDR 80 is another embodiment of a CDR 40, which is shown in FIGS. 15A, 15B as a ring-shaped structure having a main aperture 88 in the center thereof. As with other embodiments of the CDR 40 disclosed herein, the CDR 40 may be mounted to rotational equipment through any structure and/or method without limitation. The embodiment of the radial CDR 80 shown in FIGS. 15A and 15B includes three straps 70 affixed to the radial CDR 80 via fasteners 72. Other fasteners 72 may be used to secure the straps 70 to the rotational equipment, thereby securing the radial CDR 80 to the rotational equipment. In other embodiments of the radial CDR 80, the radial exterior surface 85a of the radial CDR 80 is press-fit into the rotational equipment housing 16. However, the mounting method for the radial CDR is in no way limiting to its scope.

The embodiment of the radial CDR 80 shown herein includes three radial channels 82 extending from the radial exterior surface 85a to the radial interior surface 85b. Each radial channel 82 may include a radial channel shelf 83, which is best shown in FIG. 15B. In the pictured embodiment, the radial channel shelf 83 is located adjacent the radial interior surface 85b of the radial CDR 80.

A conductive assembly 86 may be configured to securely fit within the radial channel 82. One embodiment of a conductive assembly 86 is shown in detailed in FIG. 15C. The conductive assembly 86 may comprise a binder 86a that is primarily located within the radial channel 82 and a contact portion 86b that extends radially inward from the radial channel 82. The binder 86a may be formed as any structure that retains the elements of the conductive assembly 86, including but not limited to a chemical adhesive, structural cap or tether, or combinations thereof. Other types of conductive assemblies 86 may be used with the radial CDR 80 without limitation.

The conductive assemblies 86 in the radial CDR 80 may be configured to be replaceable. That is, once the contact portion 86b of a conductive assembly 86 has been exhausted, or the conductive assembly 86 should otherwise be replaced, the user may remove the conductive assembly 86 from the radial channel 82 and insert a new conductive assembly 86 therein.

Illustrative Embodiments of a Multi-Ring CDR

A first embodiment of a multi-ring CDR 100 is shown in FIGS. 16A-16D. This embodiment of a multi-ring CDR 100 is similar to the two-piece CDR 40 described in detail above and shown in FIGS. 7-14B. The multi-ring CDR 100 includes a retainer 110 with which at least two rings 120 are secured. The retainer 110 may be substantially ring-shaped with a retainer main aperture 118 in the center thereof, which retainer main aperture 118 corresponds to each ring main aperture 128.

The retainer 110 may be formed with a plurality of annular grooves 112a, 112b, 112c, 112d on the radial interior surface of the retainer base 111 to provide seating surfaces for the various rings 120. The embodiment of the multi-ring CDR 100 shown herein includes a total of four rings 120 and four annular grooves 112. However, other embodiments may be a greater or smaller number of rings 120 and corresponding annular grooves 112 without limiting the scope of the multi-ring CDR 100.

The rings 120 may be formed with a plurality of radial channels 122 similar to those formed in the inner body 50 for the embodiment of the CDR 40 shown in FIGS. 7-14. The radial channel 116 is typically formed on the interior axial surface 127a of the ring 120. A conductive segment 116 may be positioned in each radial channel 122. Additionally, each radial channel 122 may be formed with a catch 122a therein to better retain the conductive segment 116.

Figure 16A:
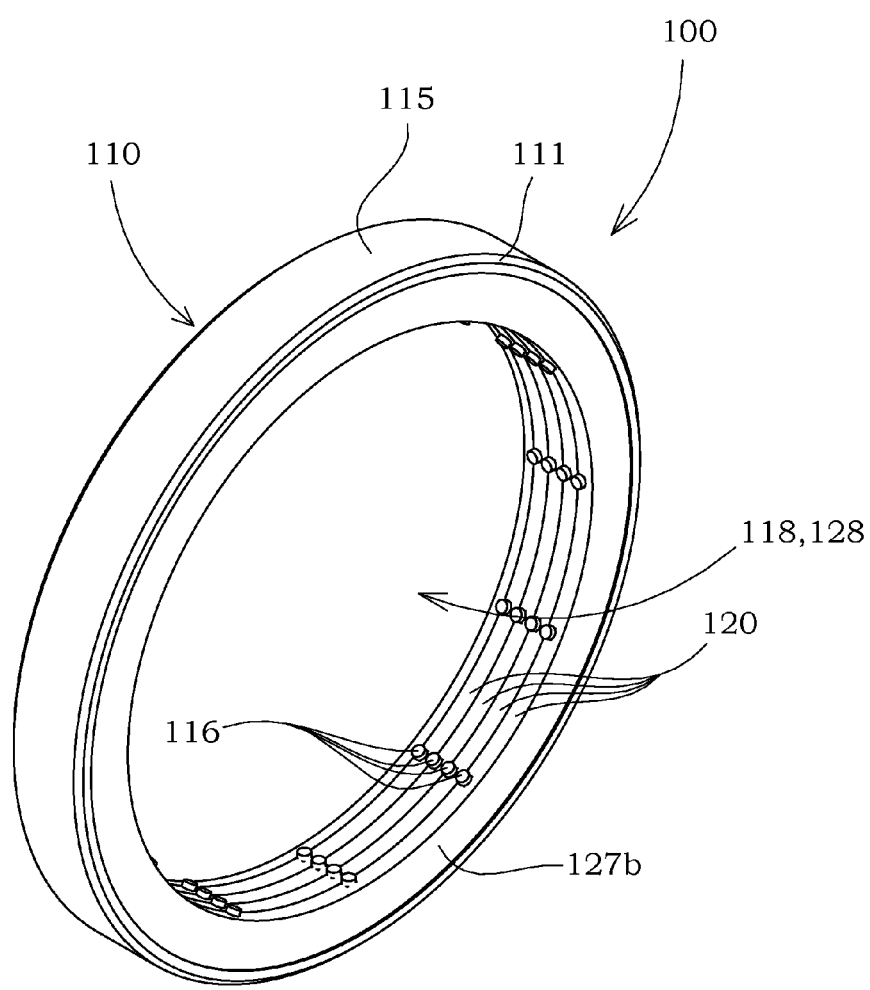
FIG. 16A is a perspective view of a fourth embodiment of the current diverter ring.
Figure 16B:
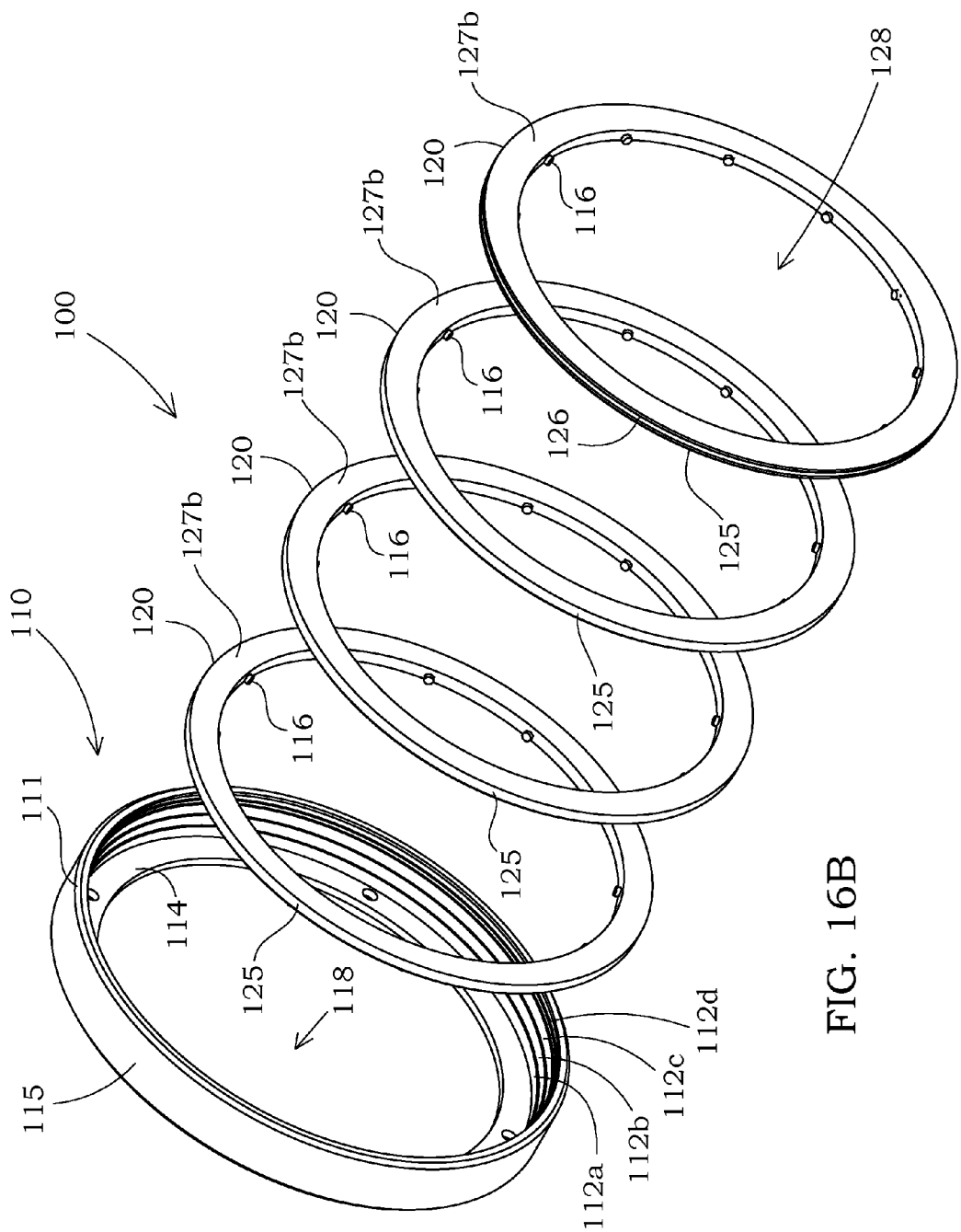
FIG. 16B is a perspective, exploded view of the fourth embodiment of the current diverter ring.
Figures 16C, 16D:
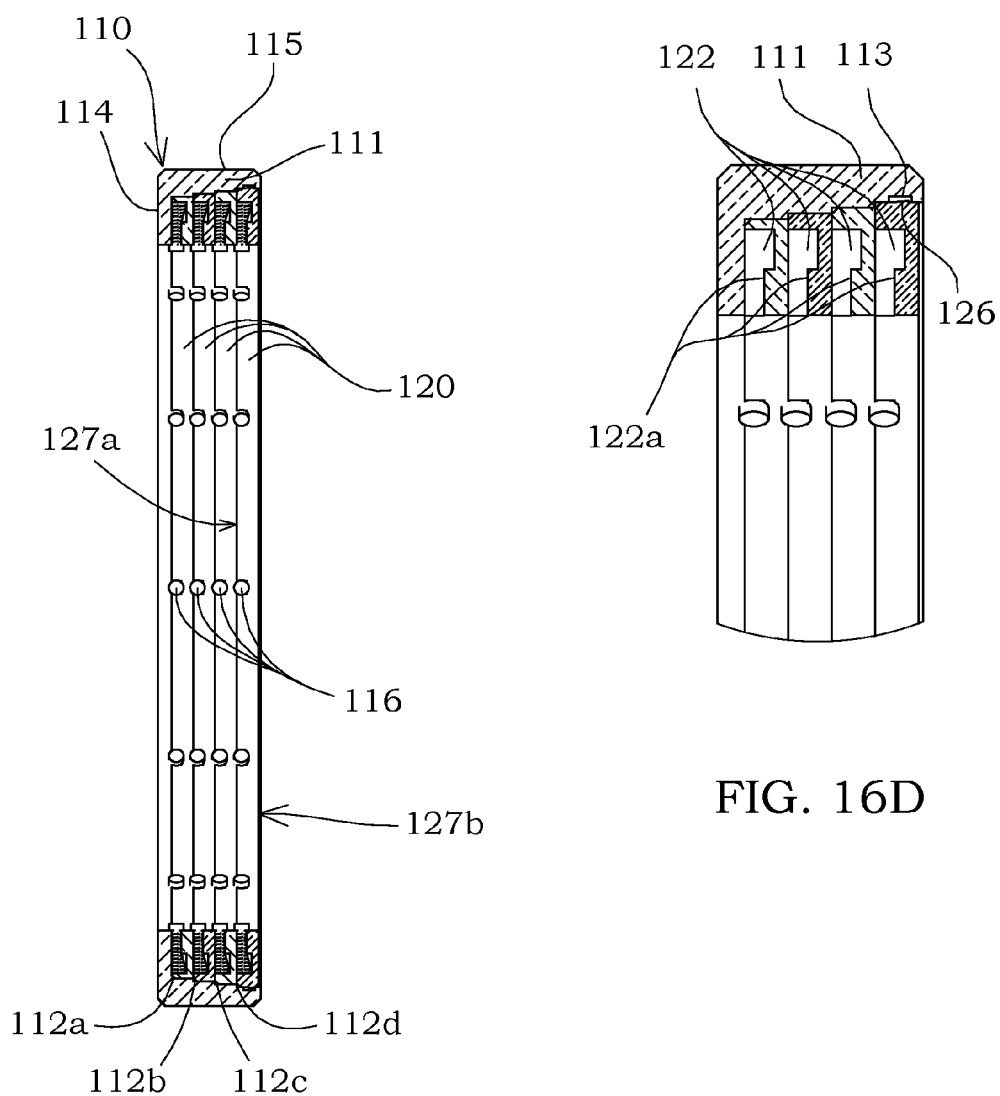
FIG. 16C is an axial cross section view of the fourth embodiment of the current diverter ring.
FIG. 16D is a detailed cross section view of the fourth embodiment of the current diverter ring.
Figure 17A:
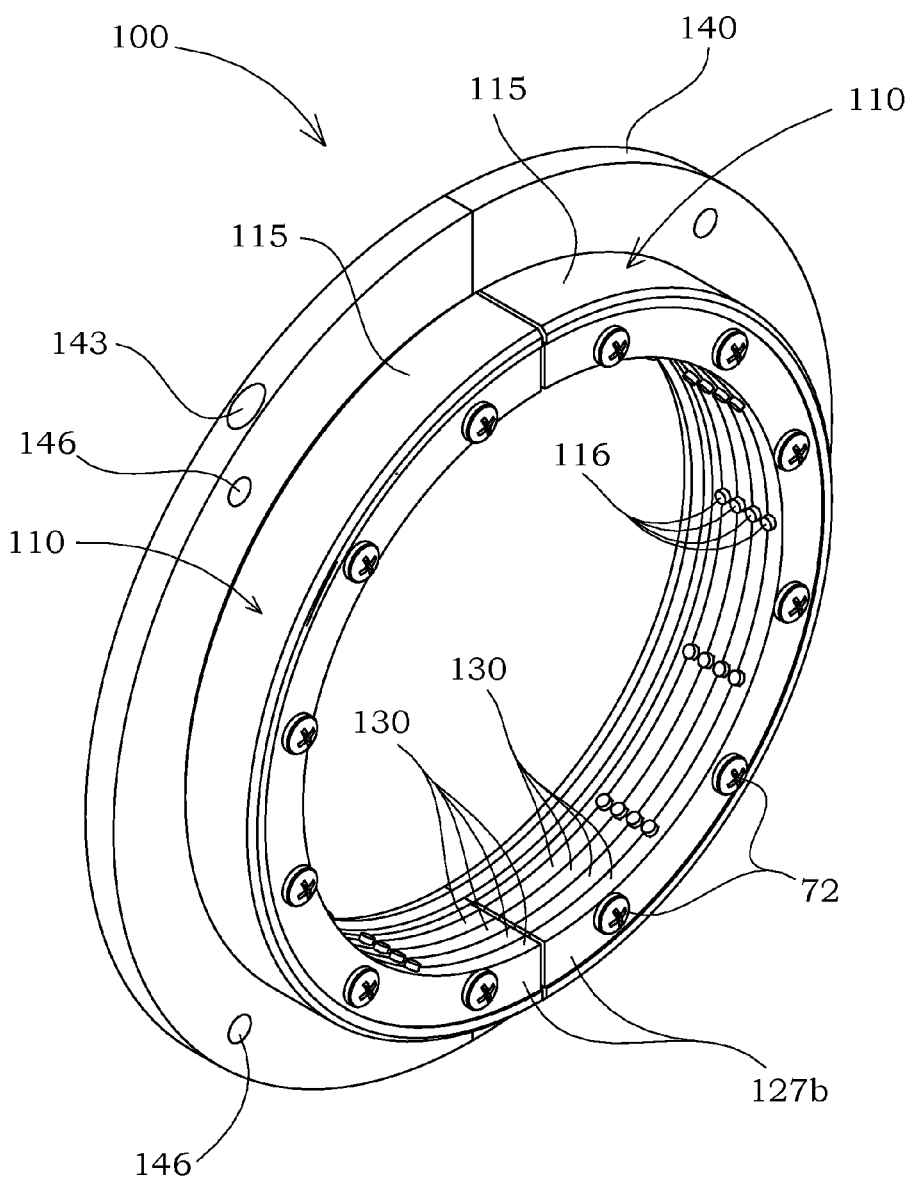
FIG. 17A is a perspective view of a fifth embodiment of the current diverter ring having a split design.
Figure 17B:
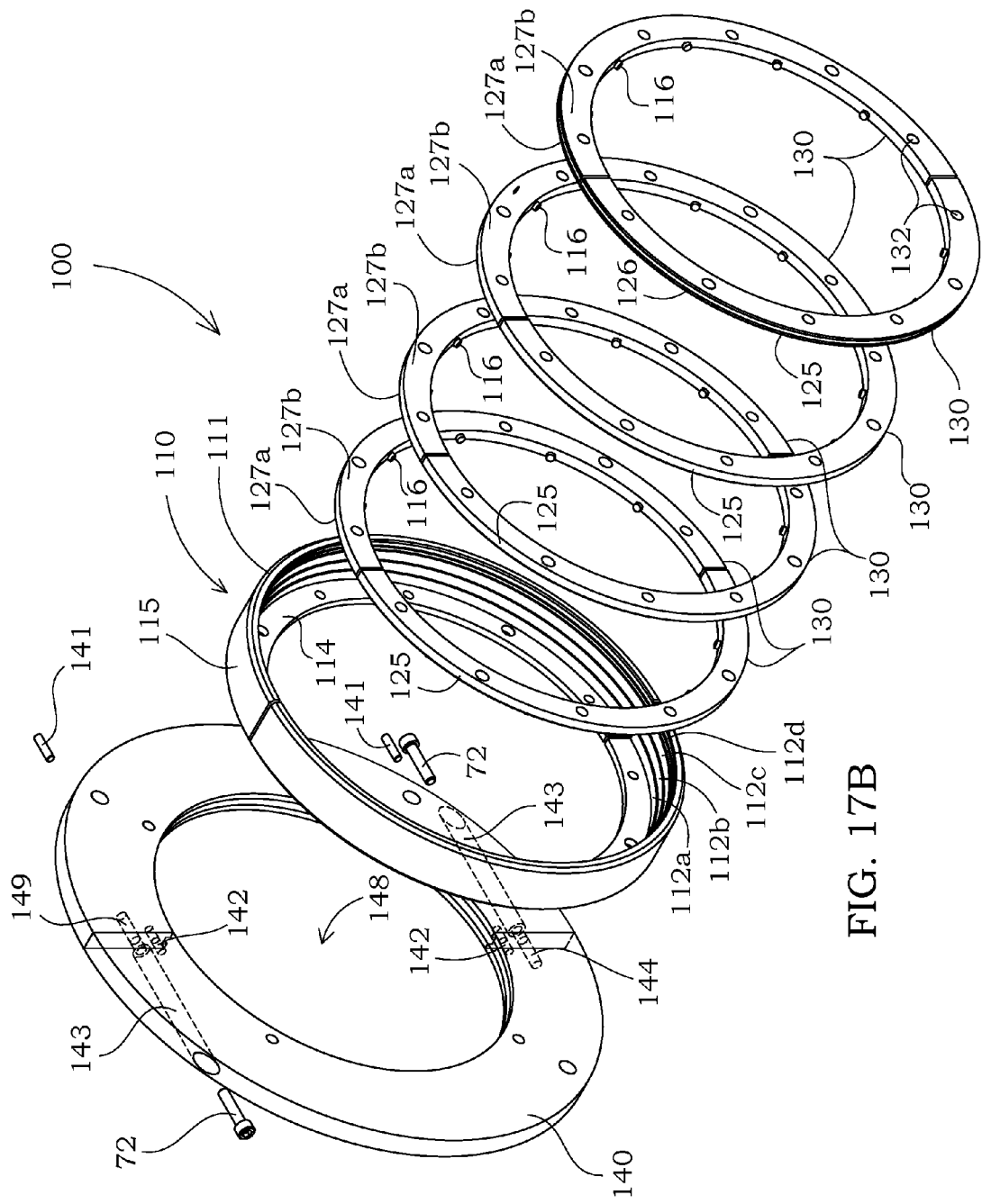
FIG. 17B is a perspective, exploded view of the fifth embodiment of the current diverter ring.
Figures 17C, 17D:
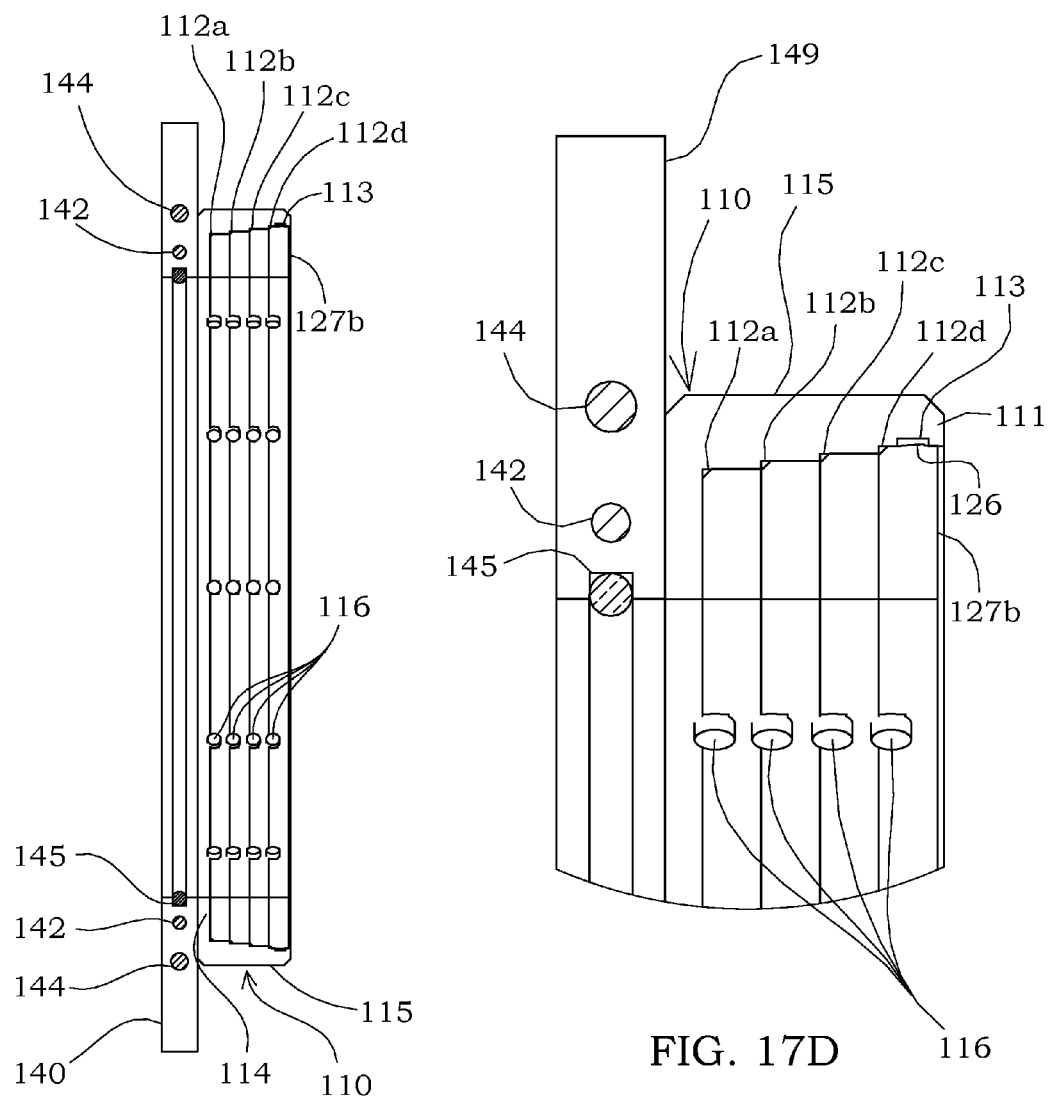
FIG. 17C is an axial cross section view of the fifth embodiment of the current diverter ring.
FIG. 17D is a detailed cross section view of the fifth embodiment of the current diverter ring.

A retainer wall 114 may extend radially inward from the first annular groove 112a toward the retainer main aperture 118, which retainer wall 114 is analogous to the radial projection 66 of the outer body 60 for the CDR 40 embodiment shown in FIGS. 7-14. In the embodiments pictured herein, the retainer wall 114 is substantially perpendicular to the retainer base 111. The retainer wall 114 may serve as a stop for the innermost ring 120 as shown in FIGS. 16C and 16D. The interior axial surface 127a of the innermost ring 120 may abut the retainer wall 114, thereby compressing the conductive segments 116 positioned in the radial channels 122 of the innermost ring 120 between the ring 120 and the retainer wall 114. The ring radial exterior surface 125 of the innermost ring 120 may engage the first annular groove 112a in such a manner as to secure the innermost ring 120 to the retainer 110 via an interference fit.

The interior axial surface 127a of the ring 120 immediately exterior to the innermost ring 120 may abut the exterior axial surface 127b of the innermost ring 120, thereby compressing the conductive segments 116 positioned in the radial channels 112 of that ring 120 between that ring 120 and the innermost ring 120. The ring radial exterior surface 125 of the ring 120 immediately exterior to the innermost ring 120 may engage the second annular groove 112b in such a manner as to secure that ring 120 to the retainer via an interference fit. This is shown in detail in FIGS. 16C and 16D. The arrangement may continue with all rings 120 engaged with the retainer 110.

The outermost ring 120 may be configured with a ridge 162 on the ring radial exterior surface 125. This ridge 162 may be angled upward from the interior axial surface 127a to the exterior axial surface 127b, such that the ridge 126 engages a snap groove 113 that may be formed in the outermost annular groove 112 (which is the fourth annular groove 112d in the embodiment shown herein). Accordingly, the outermost ring 120 may be secured to the retainer 110, thereby securing all other rings 120, through the engagement of the ridge 126 with the snap groove 113. This is analogous to the engagement of the inner body 50 with the outer body 60 via the ridge 56 and annular groove 64, respectively located on the inner body 50 and outer body 60 for the CDR 40 shown in FIGS. 7-14.

In a split embodiment of a multi-ring CDR 100, the rings 120 may be secured to the retainer 110 using fasteners, such as fasteners, as shown in FIGS. 17A-17D. The rings 120 in this embodiment may be comprised of two ring segments 130, and the retainer 110 may be formed as two separate pieces. The interaction between the innermost split ring segments 130 and the retainer 110 is analogous to that described above for the first embodiment of the multi-ring CDR 100. Furthermore, the interaction between adjacent split ring segments 130 and the corresponding retention of conductive segments 116 for the split multi-ring CDR 100 is analogous to that described for the first embodiment of the multi-ring CDR 100. To retain the split ring segments 130, an interference fit between the ring radial exterior surface 125 and individual annular grooves 112a, 112b, 112c, 112d in conjunction with a snap groove 113 in the outermost annular groove 112 and a ridge 126 in the outermost ring 120. The interference fit securement mechanism may be employed alone or in combination with a plurality of fasteners 72, or the plurality of fasteners 72 may be solely employed as a securement mechanism. If fasteners 72 are used, the ring segments 130 may be formed with apertures 132 to receive the fasteners 72.

A backing ring 140 may be used with certain embodiments of the CDR 40, 80, 100, as shown in FIGS. 17A-17D. The backing ring 140 may also be formed of two distinct pieces, which pieces may be secured to one another through a plurality of corresponding alignment pin receptors 142, fastener bores 143, fastener receptors 144 and corresponding alignment pins 141 and fasteners 72. In the embodiment shown in FIG. 17B, two alignment pins 141 and corresponding alignment pin receptors 142 are positioned at the seam of the backing ring 140 to properly align the two pieces. Two fasteners 72 may be placed in respective fastener bores 143 so that a portion of each fastener 72 engages a respective fastener receptor 144, thereby securing the two pieces of the backing ring 140 to one another.

The backing ring 140 may be manufactured so that the gap between the two pieces is negligible so as to prevent ingress of contaminants to and egress of lubricants from the bearing location. To do this, first a circle may be bisected across its diameter. The two pieces, when joined, form an ellipse due to the material removed during cutting. Accordingly, the two pieces may be machined so that together they form a perfect or near perfect circle. Alignment pin receptors 142 and corresponding alignment pins 141 and/or fastener bores 143 and corresponding fasteners 72 may be used alone or in combination to secure the relative positions of the two pieces (as described above) during the machining Relative stability of the two pieces is required to create a perfect or near perfect circle from the two pieces. At this point the backing ring main aperture 148 and O-ring channel 145 may be fashioned in the backing ring 140 to the desired specifications. Apertures 146 may be fashioned in the backing ring 140 per the user's requirements so that the perfectly or near perfectly circular backing ring 140 may be properly centered over a shaft or other structure.

Illustrative Embodiment of an Adaptable CDR

Figure 18A:
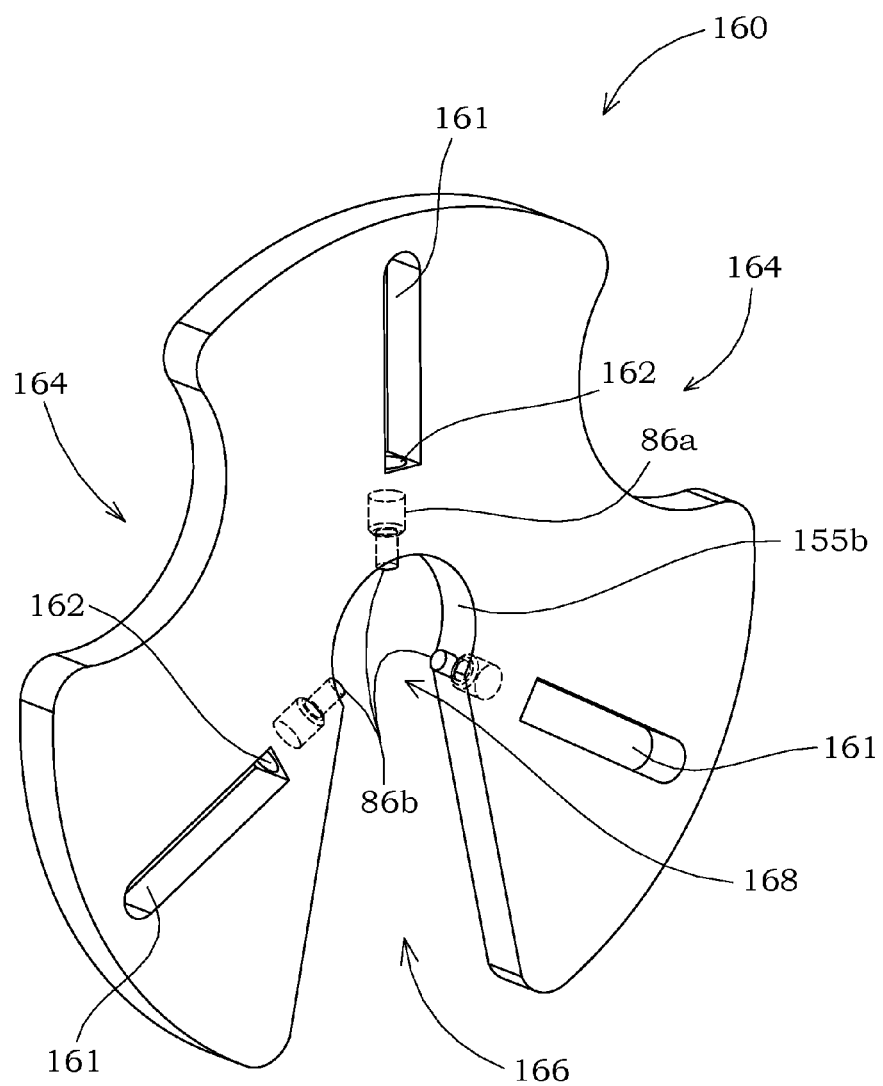
FIG. 18A is a perspective view of one embodiment of an adaptable current diverter ring.
Figure 18B:
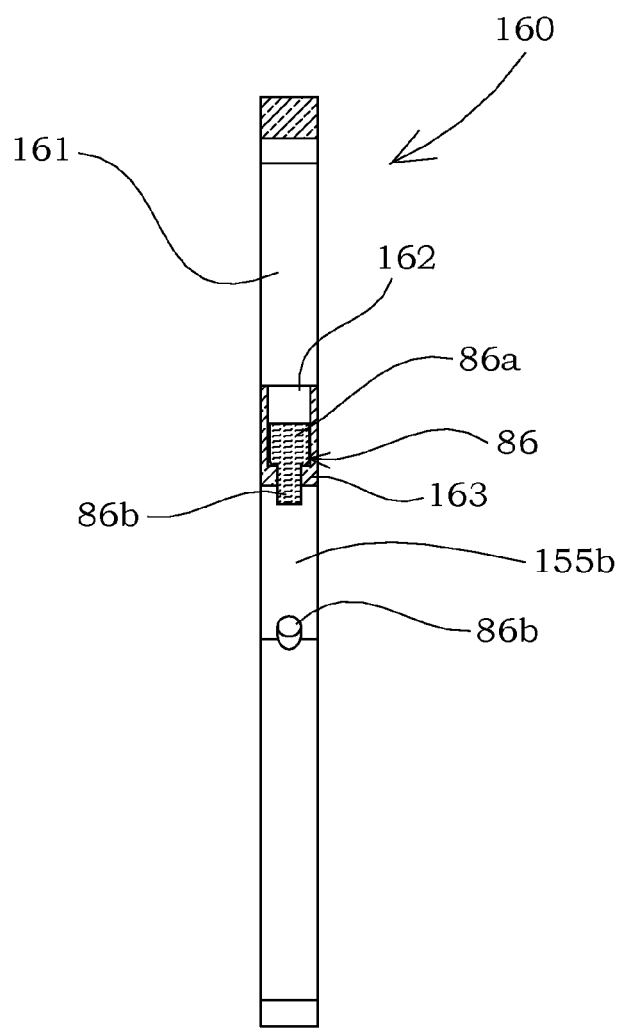
FIG. 18B is an axial cross section view of one embodiment of an adaptable current diverter ring.

One embodiment of an adaptable CDR 160 is shown in FIGS. 18A and 18B. The adaptable CDR 160 is designed so that it may be mounted to a wide variety of rotational equipment with different geometries. The adaptable CDR may include a plurality of radial channels 162 that extend from the radial exterior surface 165a to the radial interior surface 165b adjacent the main aperture 168. Like the radial channels 82 in the radial CDR 80, the radial channels 162 in the adaptable CDR 160 may include a radial channel shelf 163. Accordingly, a conductive assembly 86 may secured in each radial channel 162.

It is contemplated that the user will drill and tap holes in the exterior of the rotational equipment such that a fastener 72 may pass through each of the slots 161 formed in the adaptable CDR 160. The adaptable CDR 160 may include a plurality of recesses 164 to better accommodate differences in the exterior of various rotational equipment. The adaptable CDR 160 may have a cut out 166 protruding into the main aperture 168 to facilitate installation of the adaptable CDR 160 over a shaft or other object.

The bearing isolator 10 and/or CDR 40 employed with an equipment housing 16 creates a stable, concentric system with the rotating shaft 14 as the center point. Inserting a CDR 40 into bearing isolator 10 such as the one shown in FIGS. 2 and 3 within the equipment housing 16 forms a relatively fixed and stable spatial relationship between the conducting elements, thereby improving the collection and conduction of electrostatic discharge from the shaft 14 to ground, through the conducting elements of the CDR 40 and bearing isolator 10. This improved motor ground sealing system directly seats major elements together, which compensates for imperfections in the shaft 14 (which may not be perfectly round) and ensures the variation or change in distance from the conductive segments 46 to the surface of the shaft 14 caused by external forces acting on the CDR 40 and/or bearing isolator 10 are minimal. This promotes effective conduction of electrical charges from the shaft 14 to the equipment housing 16.

Having described the preferred embodiments, other features of the CDR 40, 80, 100, 160 and disclosed bearing isolators 10 will undoubtedly occur to those versed in the art, as will numerous modifications and alterations in the embodiments as illustrated herein, all of which may be achieved without departing from the spirit and scope of the CDR 40, 80, 100, 160 and/or bearing isolator 10. It should be noted that the bearing isolator 10 and CDR 40, 80, 100, 140 are not limited to the specific embodiments pictured and described herein, but are intended to apply to all similar apparatuses and methods for dissipating an electrical charge from a shaft 14 to an equipment housing 16. Modifications and alterations from the described embodiments will occur to those skilled in the art without departure from the spirit and scope of the bearing isolator 10 and CDR 40, 80, 100, 140.

The invention claimed is:
1. A radial current diverter ring comprising:
 a. a body that is substantially ring-shaped;
 b. a main aperture positioned in the center of said main body;

c. a plurality of radial channels, wherein each said radial channel extends from the radial exterior surface of said body to the radial interior surface of said body;

d. a radial channel shelf, wherein said radial channel shelf is positioned in one of said radial channels adjacent the radial interior surface of said main body; and, e. a conductive assembly positioned in one of said radial channels, wherein a contact portion of said conductive assembly protrudes from said radial channel radially inward past said radial interior surface.

2. The radial current diverter ring according to claim 1 wherein said plurality of radial channels is further defined as three radial channels.

3. The radial current diverter ring according to claim 1 wherein said plurality of radial channels is further defined as four radial channels.

4. The radial current diverter ring according to claim 1 wherein said plurality of radial channels is further defined as five radial channels.

5. The radial current diverter ring according to claim 1 wherein said plurality of radial channels is further defined as six radial channels.

6. The radial current diverter ring according to claim 1 wherein said plurality of radial channels is further defined as seven radial channels.

7. The radial current diverter ring according to claim 1 wherein said plurality of radial channels is further defined as eight radial channels.

8. The radial current diverter ring according to claim 2 wherein said plurality of radial channels is further defined as being equally spaced about said body.

9. The radial current diverter ring according to claim 3 wherein said plurality of radial channels is further defined as being equally spaced about said body.

10. The radial current diverter ring according to claim 4 wherein said plurality of radial channels is further defined as being equally spaced about said body.

11. The radial current diverter ring according to claim 5 wherein said plurality of radial channels is further defined as being equally spaced about said body.

12. The radial current diverter ring according to claim 6 wherein said plurality of radial channels is further defined as being equally spaced about said body.

13. The radial current diverter ring according to claim 7 wherein said plurality of radial channels is further defined as being equally spaced about said body.

14. The radial current diverter ring according to claim 1 wherein said current diverter ring further comprises a plurality of conductive assemblies corresponding to said plurality of radial channels.

15. The radial current diverter ring according to claim 1 wherein a radial exterior surface of said body is further defined as being angled in the axial direction such that said radial current diverter ring may be securely pressed into either a receptor groove formed in a bearing isolator or an aperture formed in a motor housing.

16. The radial current diverter ring according to claim 1 wherein said body further comprises a plurality of mounting apertures positioned in an axial face thereof, and wherein a plurality of fasteners and straps cooperatively engage said plurality of mounting apertures.

17. The radial current diverter ring according to claim 1 wherein said conductive assembly comprises a carbon-based filament.

18. The radial current diverter ring according to claim 1 wherein said conductive assembly comprises a binder and a contact portion, and wherein said contact portion extends into said main aperture.

19. The radial current diverter ring according to claim 1 wherein said body is further defined as being constructed of bronze.

20. The radial current diverter ring according to claim 1 wherein said body is further defined as being positioned adjacent a body of a second radial current diverter ring.

* * * * *

UNITED STATES PATENT AND TRADEMARK OFFICE
CERTIFICATE OF CORRECTION

Page 1 of 1

PATENT NO. : 8,604,653 B2
APPLICATION NO. : 13/089017
DATED : December 10, 2013
INVENTOR(S) : David C. Orlowski et al.

It is certified that error appears in the above-identified patent and that said Letters Patent is hereby corrected as shown below:

On the title page of this patent the text under "Related U.S. Application Data" paragraphs labeled (63) and (64) are incorrect. Accordingly, the suggested correction is to remove the text on the title page as shown:

~~Continuation-in-part of application No. 12/757,040, filed on Apr. 9, 2010, now abandoned, and a continuation in part of application No. 12/401,331, filed on Mar. 10, 2000, now abandoned, which is a continuation of application No. 11/378,208, filed on Mar. 17, 2006, now Pat. No. 7,521,827.~~

~~Provisional application No. 60/693,548, filed on Jun. 25, 2005, provisional application No. 61/167,928, filed on Apr. 9, 2009, provisional application No. 61/218,912, filed on Jun. 19, 2009.~~

Signed and Sealed this
Twenty-ninth Day of March, 2016

Michelle K. Lee
*Director of the United States Patent and Trademark Office*